United States Patent [19]

Preston

[11] 4,087,409

[45] May 2, 1978

[54] ORDERED HETEROCYCLIC COPOLYMERS

[75] Inventor: Jack Preston, Raleigh, N.C.

[73] Assignee: Monsanto Company, St. Louis, Mo.

[21] Appl. No.: 850,262

[22] Filed: Aug. 14, 1969

Related U.S. Application Data

[63] Continuation of Ser. No. 592,347, Nov. 7, 1966, abandoned, which is a continuation-in-part of Ser. No. 296,395, Jul. 19, 1963, abandoned.

[51] Int. Cl.$^2$ .................. C08G 69/26; C08G 73/10; C08G 73/22
[52] U.S. Cl. .................. 260/65; 260/30.8 R; 260/32.6 NT; 260/32.6 NA; 260/47 CZ; 260/47 CP; 260/78 TF; 260/78.41; 260/302 F; 260/307 D; 260/307 G; 428/474; 548/329
[58] Field of Search .......... 260/78 R, 78 TF, 47 CZ, 260/47 R, 65, 78.4 R, 78.4 E

[56] References Cited

U.S. PATENT DOCUMENTS

| | | | |
|---|---|---|---|
| 3,174,947 | 3/1965 | Marvel et al. | 260/78 TF |
| 3,179,630 | 4/1965 | Endrey | 260/78 TF |
| 3,190,856 | 6/1965 | Lavin et al. | 260/78 TF |
| 3,225,016 | 12/1965 | Reimschuessel et al. | 260/78 TF |
| 3,230,196 | 1/1966 | Moyer | 260/78 TF |
| 3,247,165 | 4/1966 | Rodia | 260/78 TF |
| 3,267,081 | 8/1966 | Rudner et al. | 260/78 TF |
| 3,282,886 | 11/1966 | Gadecki | 260/78 TF |

*Primary Examiner*—Harold D. Anderson
*Attorney, Agent, or Firm*—Thomas B. Leslie

[57] ABSTRACT

High molecular weight, thermally resistant heterocyclic polymers containing two or more different heterocyclic linkages occurring in an ordered sequence with aromatic linkages are prepared and solutions thereof used to spin fibers.

14 Claims, No Drawings

ORDERED HETEROCYCLIC COPOLYMERS

This application is a continuation of U.S. application Ser. No. 592,347, filed Nov. 7, 1966 which in turn is a continuation-in-part of U.S. application Ser. No. 296,396 filed July 19, 1963, both of which are now abandoned.

This invention relates to new condensation polymers, and more particularly to new high molecular weight, film and fiber-forming heterocyclic polymers containing at least two different heterocyclic groups in an ordered sequence and having a high degree of thermal stability.

Linear condensation polymers, such as polyamides, in the form of fibers, films and shaped articles have found wide application in textile and other industrial uses requiring high tensile strength and abrasion resistance. Subsequent searching for polymers of improved thermal resistance has produced various heterocyclic polymers such as polyoxadiazoles, polybenzimidazoles and polyimides. However, these compositions are prepared with great difficulty and are hard to fabricate into useful articles. Polybenzimidazoles are prepared from tetramines which are not easily purified. These tetramines undergo oxidation readily which probably accounts in large measure for the dark color of polybenzimidazoles. Under certain conditions large amounts of the polymer produced is also crosslinked. Since polyoxadiazoles are insoluble in any known organic solvents, the oxadiazole linkages are formed after a fiber or film has been shaped from a polyhydrazide. However, the conversion in situ of a large number of hydrazide linkages in a spun fiber to oxadiazole linkages severely affects the fine structure of the fiber, probably because of incomplete conversion of hydrazide linkages to oxadiazole linkages, or side reactions. Such fibers have poor physical properties, for example, low tensile strength compared to the polyhydrazide precursors of polyoxadiazoles. The heterocyclic copolymers of this invention on the other hand are easily prepared and readily dissolved either in final form or in precursor form to form a variety of shaped articles; linkages which are difficult to prepare may be conveniently performed prior to polymerization. Another advantage of these polymers over the prior art lies in the ability to tailor the physical properties of the polymers by suitable combinations of two or more different heterocyclic linkages, whereas the high molecular weight polymers of the prior art were essentially restricted to a single type of heterocyclic unit.

It is an object of the invention to provide new compositions of matter and a process for their preparation.

Another object is the production and provision of novel heterocyclic polymers which contain a plurality of at least two different multivalent heterocyclic linkages containing one to three heterocyclic ring members, preferably at least one of O, N and S, and may consist of up to three heterocyclic ring members so long as two such ring members are adjacent, occurring in regularly ordered sequences, individual heterocyclic nuclei being separated in the chain sequence by aromatic, or aliphatic and aromatic linkages, the polymers, either in final form and in the form of a polymeric precursor, being soluble in conventional organic solvents and exhibiting outstanding thermostable properties.

An additional object is the provision of fibers, filaments, films and other shaped articles prepared from the soluble and easily fabricated heterocyclic polymers or heterocyclic precursor polymers of this invention.

Other objects and advantages will become apparent from the following detailed description of the invention.

In general, these and other objects of the invention are accomplished by the provision of novel high molecular weight thermally resistant compositions of matter which are polymers containing two or more different five and six ring member heterocyclic linkages, preferably containing at least one of O, N and S and may consist of three or more heterocyclic ring members so long as two such ring members are adjacent, occurring in regularly ordered sequence with aromatic, or aromatic and aliphatic linkages; preferably one or more of the heterocyclic linkages is performed in a monomer and one or more heterocyclic linkages are formed during the course of polymerization. These heterocyclic units are united by hydrocarbon linkages which are multivalent hydrocarbon radicals, which may be aliphatic, cycloaliphatic, or aromatic having single, multiple, or fused ring structures. Suitable aromatic single, multiple and fused ring structures are more fully disclosed in U.S. Pat. No. 3,006,899.

The multivalent heterocyclic linkages contain at least one of O, N and S and may consist of up to three heterocyclic ring members so long as two such ring members are adjacent. The divalent heterocycle containing radicals are exemplified by:

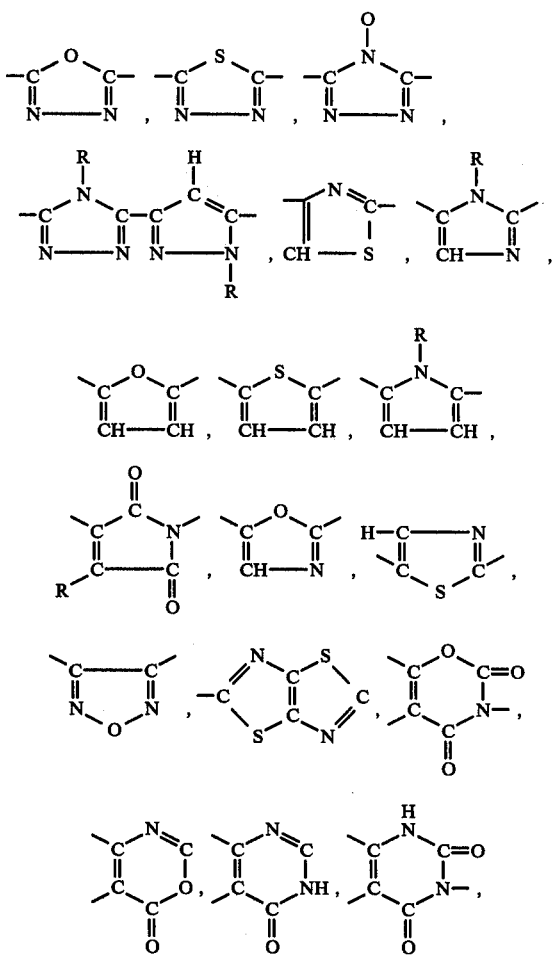

-continued
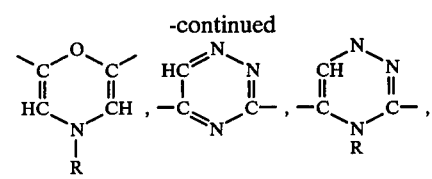
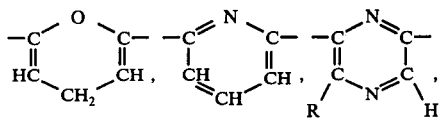
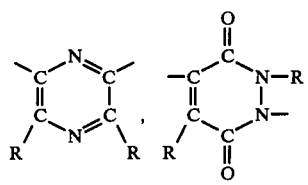
and the like, where R=H or lower alkyl.
Examples of hydrocarbon rings fused to heterocycle units include benzimidazole from imidazole, benzothiazole from thiazole, benzoxazole from oxazole, etc. Divalent heterocycle-containing radicals having fused hydrocarbon rings are exemplified by:
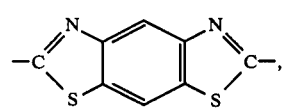
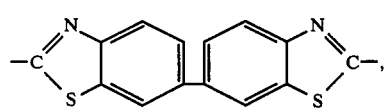
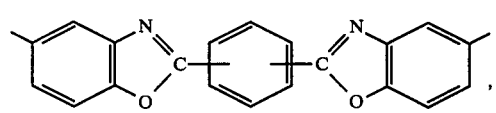
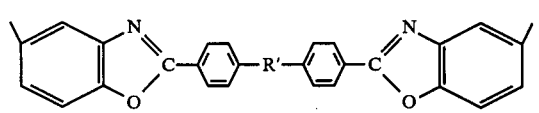
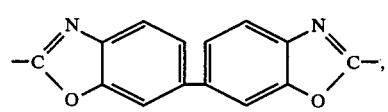
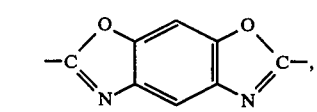
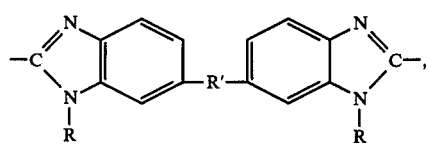
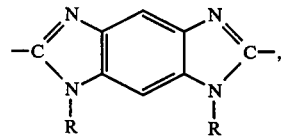
-continued
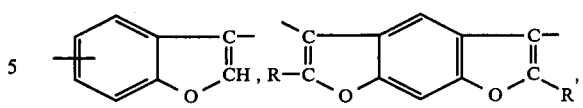
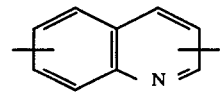
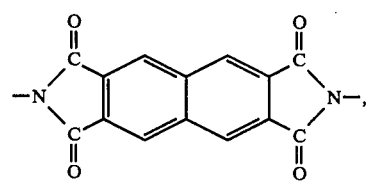
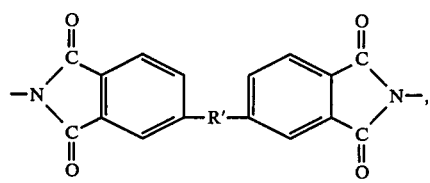
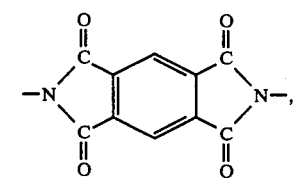
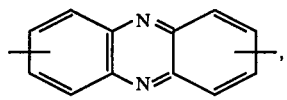
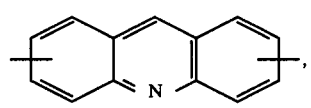
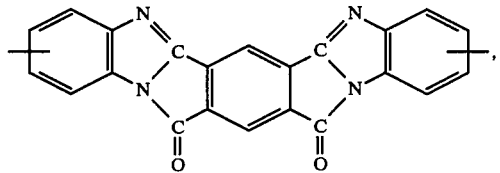
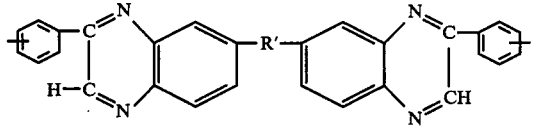
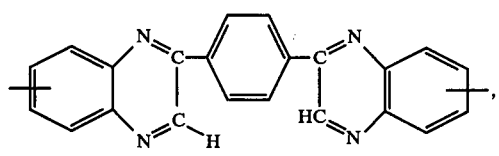

-continued
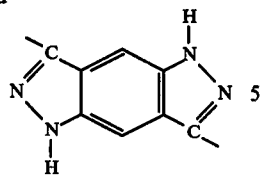
and the like where R = H or lower alkyl and R' = —O—, —S—, —SO$_2$—,
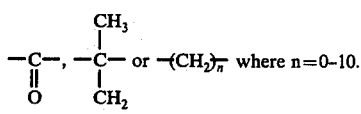
Typical polymeric compositions which are embraced by the concept of the invention include:
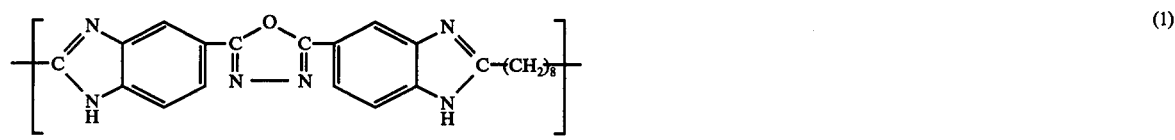 (1)
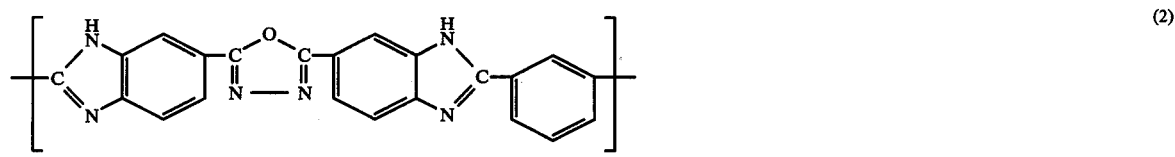 (2)
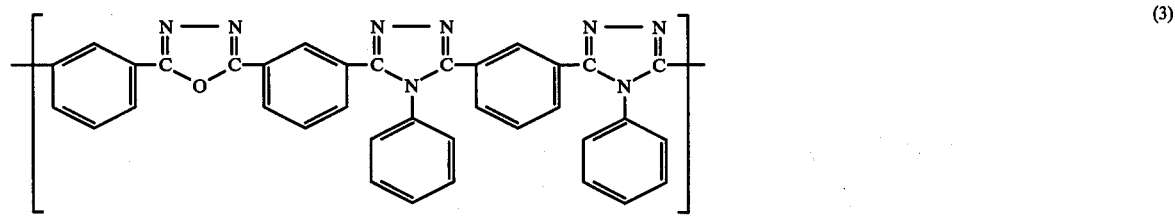 (3)
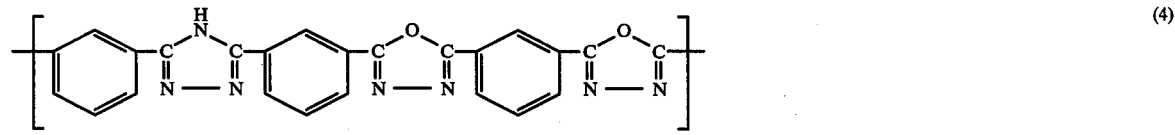 (4)
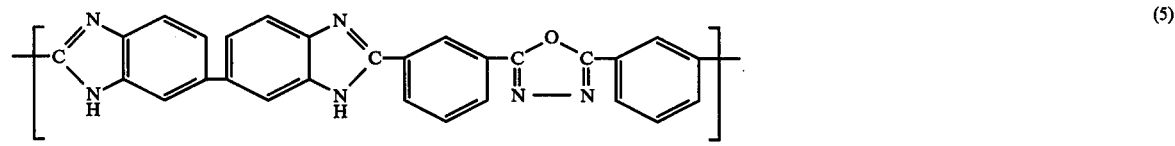 (5)
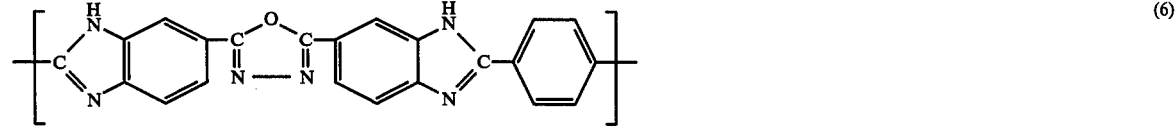 (6)
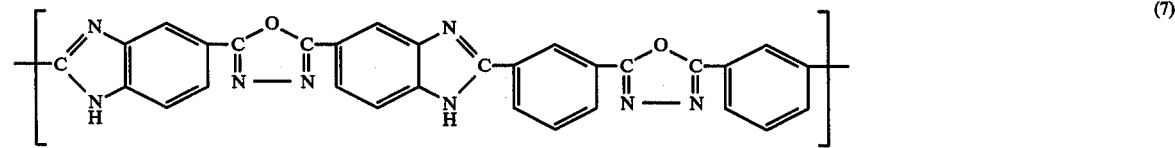 (7)
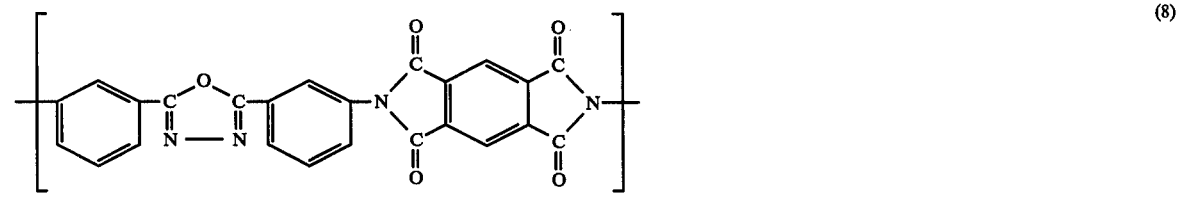 (8)

-continued
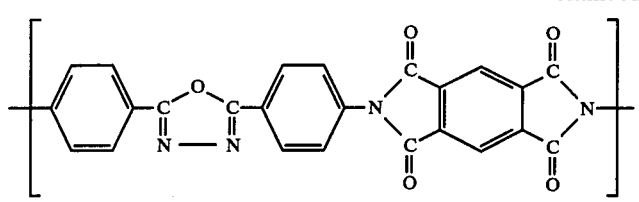
(9)
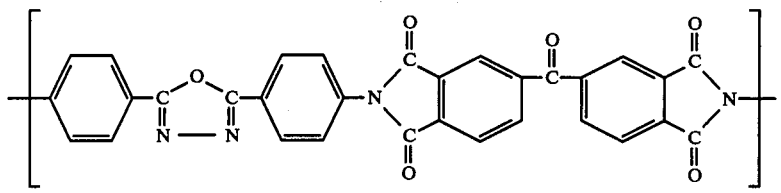
(10)
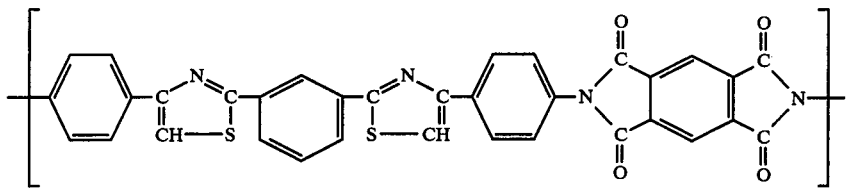
(11)
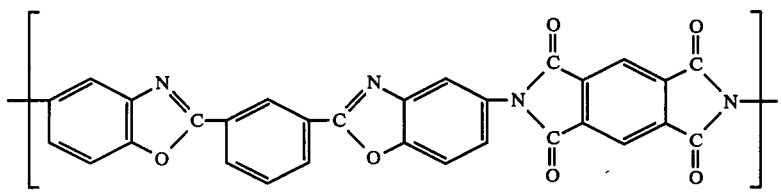
(12)
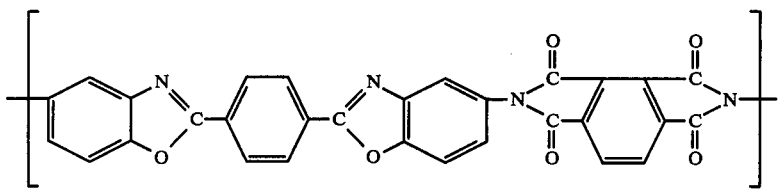
(13)
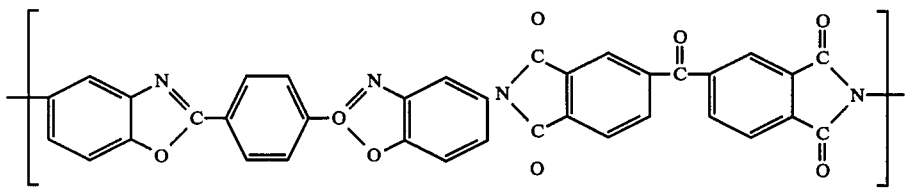
(14)
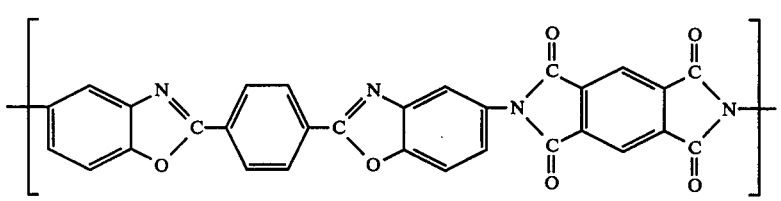
(15)
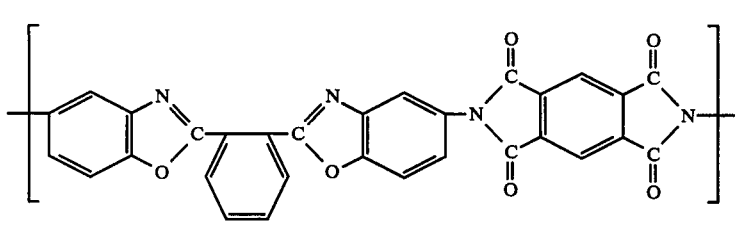
(16)

-continued
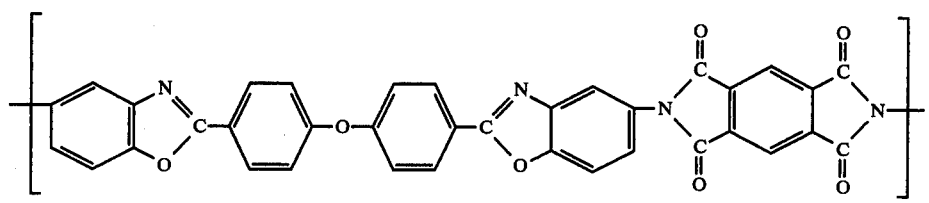
(17)
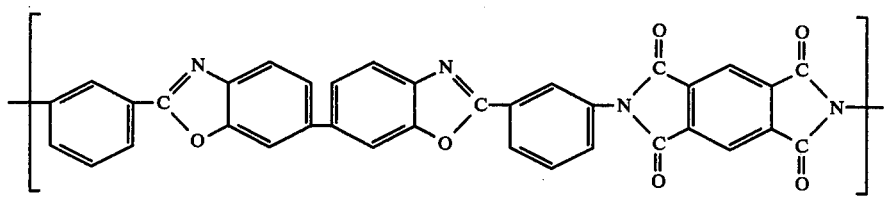
(18)
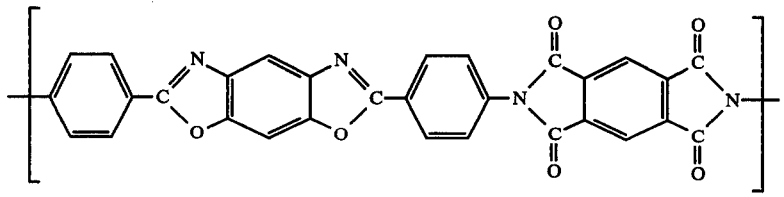
(19)
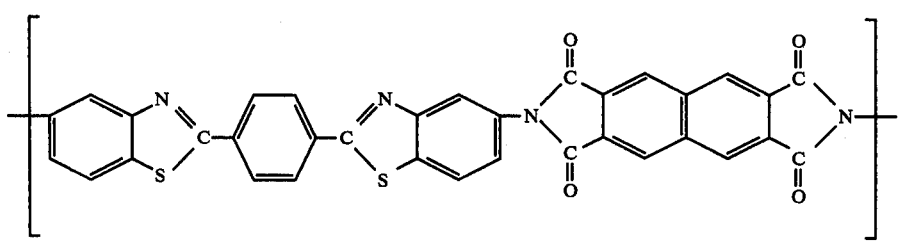
(20)
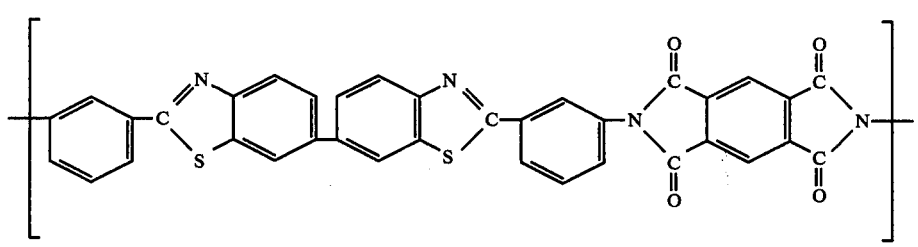
(21)
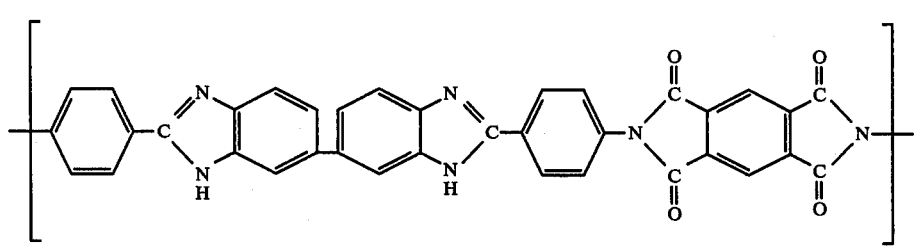
(22)
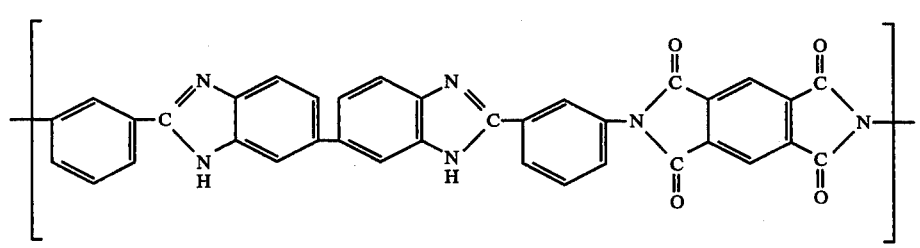
(23)

-continued
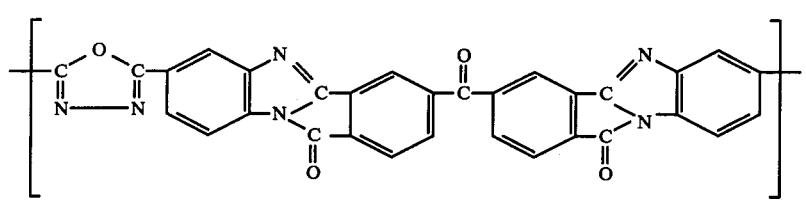
(24)
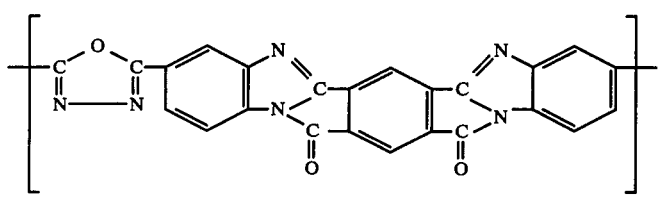
(25)
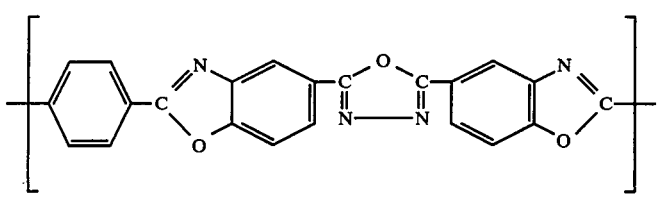
(26)
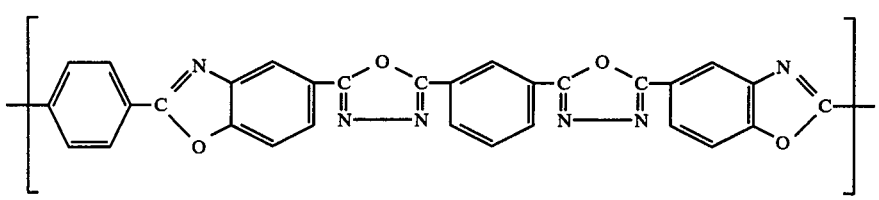
(27)
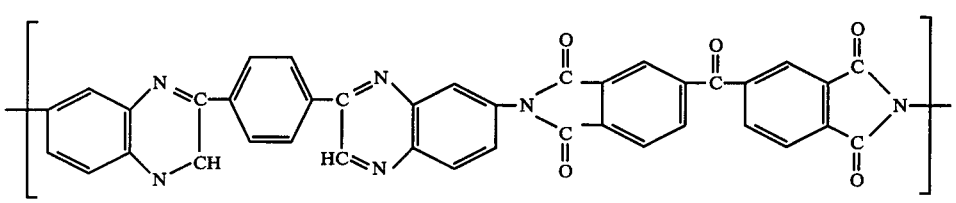
(28)
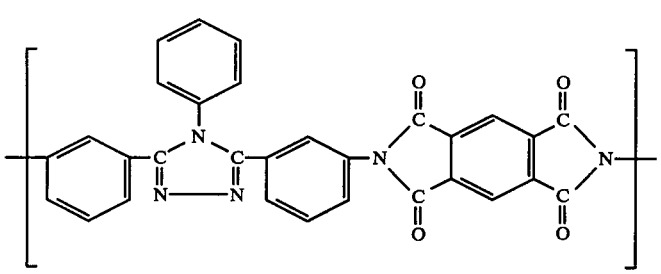
(29)
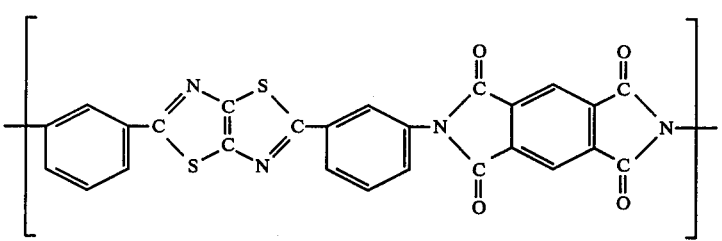
(30)

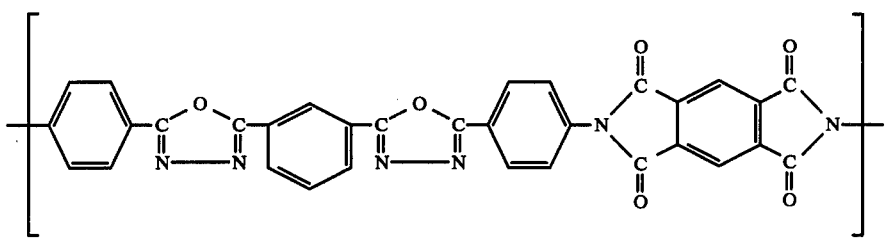
(31)
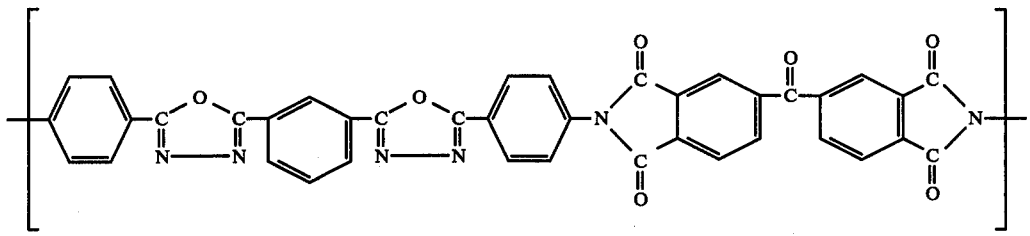
(32)
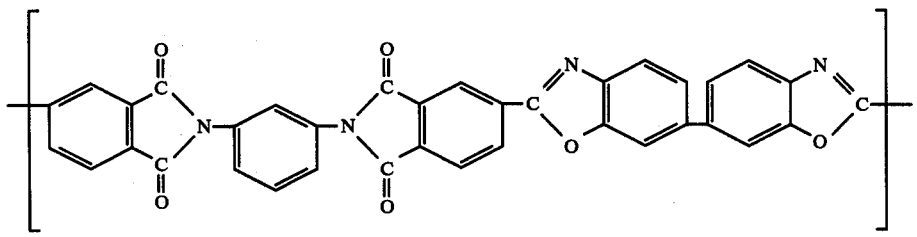
(33)
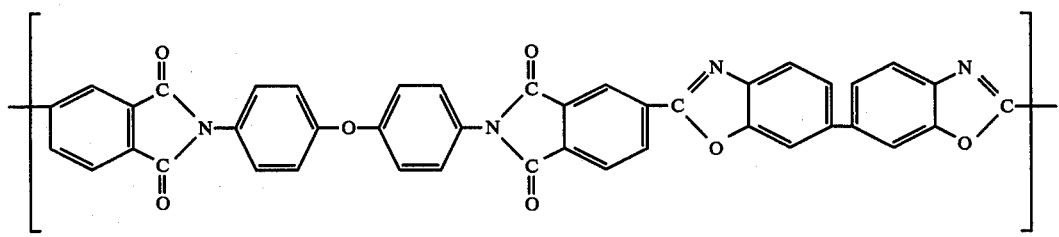
(34)
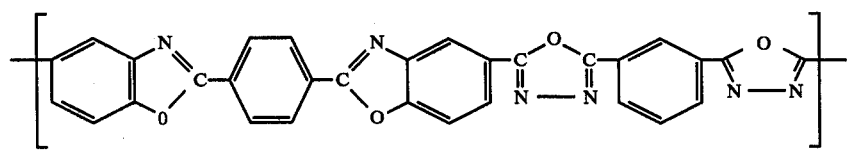
(35)
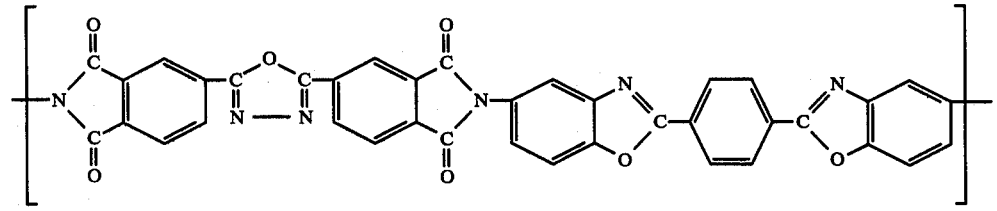
(36)
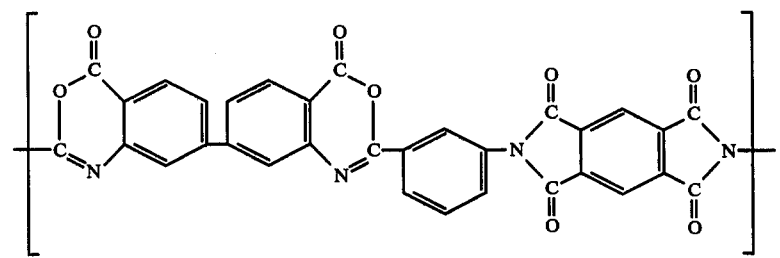
(37)

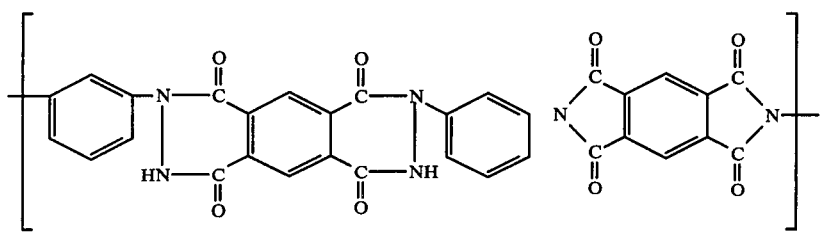

(37)

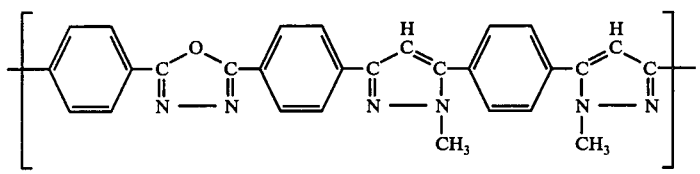

(38)

The compositions above have a degree of polymerization greatly in excess of 10, and not uncommonly in excess of 100.

The polymers of this invention may be prepared by reacting together two symmetrical monomers, each containing functional groups which react with the functional groups of the other to produce a heterocyclic polymer having at least two different heterocyclic linkages. The reaction may take place between an A and a B monomer, as defined herein, or between two A monomers.

Monomer A contains a heterocyclic linkage or its precursor and functional groups such as carboxylic, alkyl esters, phenyl esters, anhydride, amino, hydrazide, N-phenyl-imino halides, thioamide, phenacyl halides, keto-aldehyde, tetraazole, or any other group which will react with the functional groups of another A monomer or with those of a B monomer. Examples of A monomers containing heterocyclic linkages include 2,5-bis(p-aminophenyl)-1,3,4-oxadiazole, 2,5-bis(m-aminophenyl)-1,3,4-oxadiazole, 2,5-bis(3,4-diaminophenyl)-1,3,4-oxadiazole, 3,5-bis(m-aminophenyl)-4-phenyl-1,2,4-triazole, m-bis(4-p-aminophenylthiazol-2-yl)benzene, 2,5-bis (m-carboxyphenyl)-1,3,4-oxadiazole, 2,5-bis(p-carboxyphenyl)-1,3,4-oxadiazole, 3,5-bis(m-carboxyphenyl)-4-phenyl-1,2,4-triazole, 3,5-bis(p-carboxyphenyl)-4-phenyl-1,2,4-triazole, 2,5-bis(m-carboxymethyl-1,3,4-oxadiazole, 2,5-bis(m-benzoylhydrazide)-1,3,4-oxadiazole and the like.

Examples of A monomers containing precursors to heterocyclic linkages include sym-bis(p-aminobenzoyl)-hydrazide, sym-bis(m-aminobenzoyl)hydrazide, isophthaloyl bis(p-aminobenzoyl)hydrazide, bis-3-amino-6-hydroxy-terephthalamide, and the like. The functional groups of A or B monomers may be reacted to form the indicated heterocyclic linkage; a thioamide reacted with a phenacyl halide yields a thiazole; a keto-aldehyde or diketo compound with a hydrazino group yields a pyrazole, a tetraazole with an acid chloride yields an oxadiazole; a hydrazide with a phenyl-iminochloride yields a 4-phenyl-1,2,4-triazole, etc. These heterocyclic linkages are formed in addition to the heterocyclic linkages or their precursors already present in the A monomers. An example of the reaction of an A monomer with another A monomer is the reaction of 2,5-bis(3,4-diaminophenyl)-1,3,4-oxadiazole with 3,4-bis(m-carboxyphenyl)-4-phenyl-1,2,4-triazole to give a polymer having regularly occurring sequences of oxadiazole, benzimidazole, and triazole units.

Monomer B contains no heterocyclic linkage but must contain at least two functional groups reactive with those of monomer A to produce a heterocyclic linkage. Examples of monomer B include aromatic and aliphatic dicarboxylic acid, such as oxalic, adipic, succinic, glutaric, suberic, azelaic, sebacic, isophthalic, terephthalic, bibenzoic and naphthalenedicarboxylic acid, esters of these acids such as ethyl oxalate, ethyl adipate, diethyl isophthalate, dimethyl isophthalate, diphenyl isophthalate, dianhydrides such as pyromellitic dianhydride, naphthalenedianhydride, bis(phenyldicarboxylic acid anhydride)s, and other derivatives of acids, for example, isophthaloyl chloride, terephthaloyl chloride, N,N'-diphenylisophthalimidoyl chloride; aromatic diamines and tetraamines such as m-phenylenediamine, p-phenylenediamine, benzidine, 4,4'-diaminodiphenyl ether, 3,3'-diaminobenzidine, 3,3'-4,4'-diaminodiphenyl ether, 3,3'-dihydroxybenzidine, 4,6-diamino-resorcinol, isophthaloyl dihydrazide and the like. The reaction of A monomers with B monomers is illustrated by the following, 2,5-bis(m-carboxyphenyl)-1,3,4-oxadiazole reacts with 3,3'-diaminobenzidine to give a polymer containing regularly recurring sequences of oxadiazole and benzimidazole units, 2,5-bis(m-benzoylhydrazide)-1,3,4-oxadiazole reacts with N,N'-diphenyl-isophthalimidoyl chloride to give a polymer containing oxadiazole and triazole units. For example, 2,5-bis(3,4-diaminophenyl)-1,3,4-oxadiazole is reacted with diphenyl isophthalate:

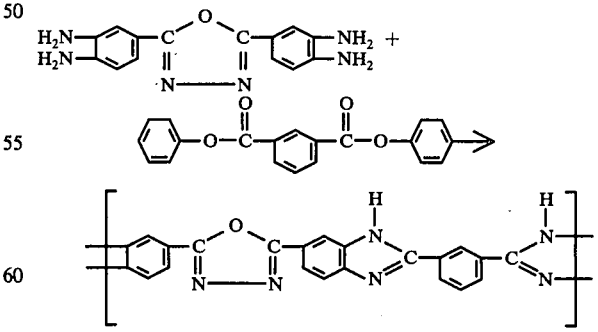

This copolymer, having one heterocyclic linkage, the oxadiazole, performed in the tetraamine monomer and the benzimidazole heterocyclic linkage formed during the polymerization reaction, illustrates the general concept of the invention.

An example of a copolymer formed from a B monomer and an A monomer having a precursor linkage shows that an oxadiazole linkage and an imide linkage may be formed as post polymerization reactions.

solution containing monomer is cooled preferably to between 20° C. and −30° C. and the second monomer is added either as a solid or in a solution of one of the aforementioned solvents. The mixture is then stirred for

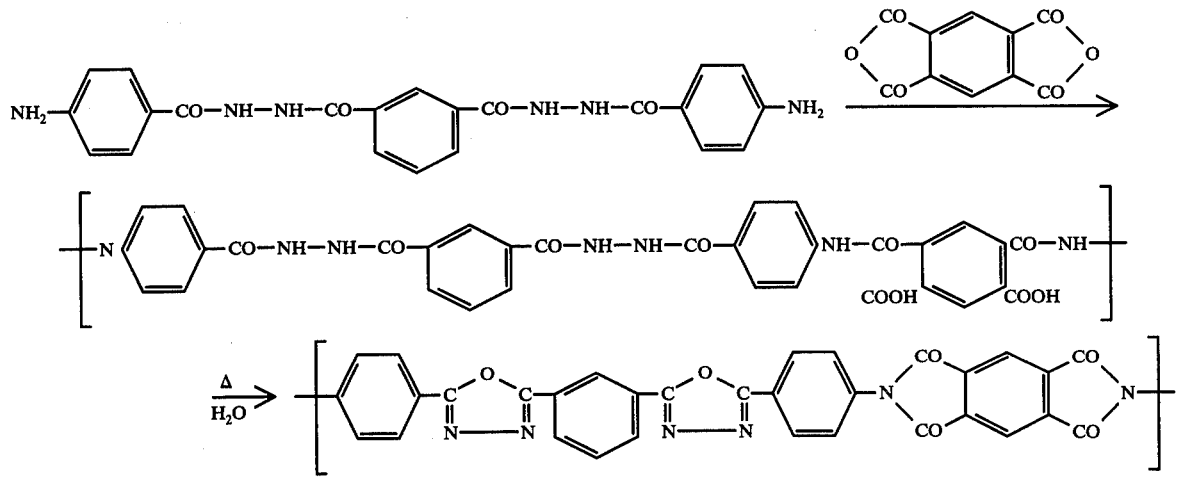

Compositions are prepared containing two, three or more different heterocyclic linkages in regular sequence. Thus, a diamine containing a preformed heterocyclic linkage may be polymerized with a monomer containing no heterocyclic linkage to give a polymer containing two different heterocyclic linkages. A diacid (or derivative thereof) containing a heterocyclic linkage may be polymerized with a tetraamine containing the same type of heterocyclic linkage to give a polymer also containing two different heterocyclic linkages. A diamine containing a precursor to a heterocyclic ring may be polymerized with a monomer containing no heterocyclic linkage to give a polymer, after appropriate treatment, containing two different heterocyclic linkages. Further, a tetraamine and a diacid (or derivative thereof), each containing a different type of linkage, may be polymerized to give a polymer containing three different heterocyclic linkages.

The polymerization of the polymers of this invention may be accomplished by solution, interfacial, and solid state methods. The amounts of the various reactants which may be employed can be varied widely in the process of the invention according to the type of polymer desired. However, in most instances substantially equimolar quantities of monomers may be used. The solution polymerization method can be generally described as follows: A heterocyclic monomer or a monomer containing a linkage which is a precursor to a heterocyclic linkage is dissolved in a suitable solvent which is inert to the polymerization reaction. The same solvents may be employed for both the heterocyclic monomer and a second monomer which may or may not contain one or more heterocyclic linkages. Among such solvents there may be mentioned dimethylacetamide, dimethylformamide, 1-methyl-2-pyrrolidone, 1,5-dimethyl-2-pyrrolidone, hexamethylenephosphoramide and the like. These solvents are rendered more effective in many instances by mixing them with a small amount (up to 10 percent) of an alkali or alkaline earth salt such as lithium chloride, lithium bromide, magnesium chloride, magnesium bromide, beryllium chloride or calcium chloride. The preferred solvents for solution polymerization are dimethylacetamide or dimethylacetamide containing 5 percent dissolved lithium chloride. The a period of time until polymerization is substantially complete and a high viscosity is obtained. The temperature of the solution after the initial reaction may be raised if advantageous to 70°–150° C. This highly viscous solution may be used directly for preparing fibers and films, or the polymer may be isolated by pouring the mixture into a non-solvent, then washing and drying the polymer and preparing a solution to be used for preparing fibers or films. For certain compositions, a heat treatment or chemical treatment is necessary to convert the shaped article (fiber, film, or the like) into polymer containing regularly ordered sequences of two or more heterocycles.

For solid state polymerization, substantially equimolar quantities of monomers, or a slight excess of the more volatile monomer, may be employed. Temperatures of 100° to 400° C. may be used and pressures of 0.01 mm. to pressures in excess of atmosphere may be employed.

The polymers of this invention have many highly desirable characteristics. Many of the compositions of the invention are tractable and malleable and can be shaped directly into fibers, films, or other shaped articles while other compositions intractable in their finished form of a fiber or film are shaped as a tractable intermediate. The intermediates used in the preparation of these heterocyclic copolymers are more stable toward oxidation and various side reactions than intermediates used in the preparation of other polymers of the prior art. Products obtained from the compositions of the invention are easily fabricated for useful products. The reactions leading to the heterocyclizations are straightforward and easy to perform. The thermal stability of certain products obtained from the compositions of this invention is superior to that of many heterocyclic polymers which contain only one heterocyclic linkage rather than the ordered combination of several different types of heterocyclic linkages embraced by the present invention. Polymer compositions containing various heterocyclic linkages can be prepared by several different routes. Thus, heterocyclic linkages or precursor groups to heterocyclic linkages can be preformed or built into amine monomers or can be preformed or built into heterocyclic acid (or derivatives thereof) monomers, such as 2,5-bis(carboxyphenyl)-1,3,4-oxadiazole or its esters. Other functional groups which react together well to yield heterocyclic linkages may be used.

Additionally, it has been found that where it is desirable to have a heterocyclic linkage containing three hetero ring members, two of such ring members must be adjacent in order for the polymer to exhibit the thermal stability and other properties which are an important feature of the invention. Having two ring members adjacent renders the synthesis of the heterocyclic ring easier, makes possible heterocyclic rings linked through the nitrogen atom and aids in solubility and thermal stability. The presence of three heterocyclic ring members in alternating sequence lowers the solubility and thermal stability of the polymer.

Other features which must be carefully eschewed are the presence of functional groups (used to make a heterocyclic linkage) directly attached to heterocyclic rings. Thus, in the operation of this invention difunctional monomers, for example, of the diacid type,

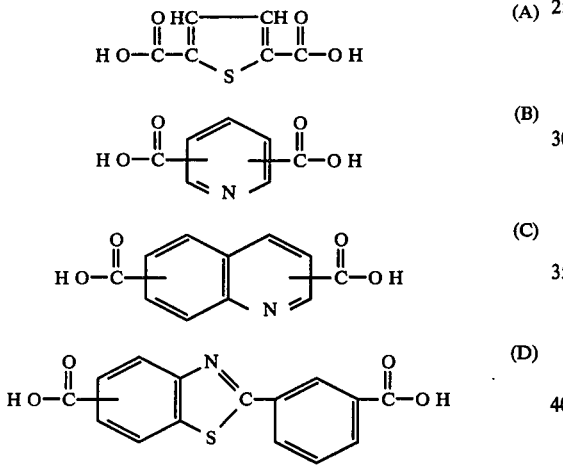

would not perform adequately because:

(1) A and B would form polymers having heterocyclics to heterocyclic linkages without the benefit of an insulating hydrocarbon unit.

(2) C would have a partial insulating effect, which would be insufficient; but worse would be the effect of random placement of this unit along a polymer chain.

(3) D would adequately insulate heterocyclic groups from one another but the dissymetry of this unit would lead to polymers having random placement of this unit along a polymer chain.

Insulation of one heterocyclic unit from the other is important to the mechanical and thermal properties of the polymers. The desirability of a regular structure by use of symmetrical units prevents formation of a random structure which produces the effect of internal plasticization, making the polymer have a lower softening point, and a lower tensile strength, especially at elevated temperatures.

The high temperature resistance and low dielectric constant of the compositions of the invention render them useful in applications such as electrical insulation, industrial filters, conveyor belts, tire cord, films, heat resistant parachutes, composites, laminates, fuel cells, cable and wire coatings and the like.

To further illustrate the present invention and the advantages thereof, the following specific examples are given, it being understood that these are merely intended to be illustrative and should not be considered as limiting the scope of the invention. In the examples all parts and percentages are by weight unless otherwise indicated.

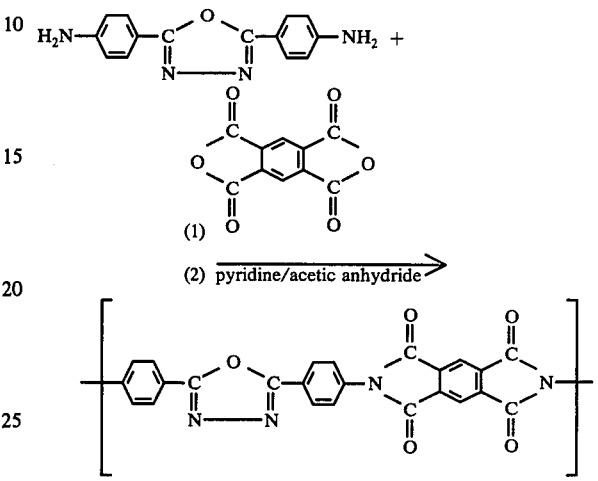

Into a conical flask was placed 2.52 g. (0.01 mol) of 2,5-bis(p-aminophenyl)-1,3,4-oxadiazole in 18 ml. of dry dimethylacetamide (DMAc), the resulting solution was cooled and mixed with 2.02 g. (0.011 mol) of pyromellitic dianhydride (PMDA). The method for the preparation of 2,5-bis(p-aminophenyl)-1,3,4-oxadiazole was disclosed in U.S. Pat. No. 2,765,304 by Siegrest et al. The solution was stirred for 1 hour at 0° C., then allowed to warm to room temperature. The mixture was stirred for 60 hours to insure complete reaction with a nitrogen atmosphere being used during the course of polymerization. After the polymerization reaction was complete, a 15 percent solids solution of polymer in DMAc was prepared from which films were cast 15 mils. in thickness and baked at 110° to 120° C. The inherent viscosity of the polymer at this stage was 1.9 (measured at 30° C. for a solution of 0.5 g/100 ml. dimethylacetamide). These films, which were a polyamide-oxadiazole-acid, were cut in strips, soaked in a pyridine acetic anhydride mixture in a 3:1 ratio, respectively, for 24 hours, rinsed in dioxane and dried at 110° C. The treatment converted the polyamide-oxadiazole-acid to the polyimide-oxadiazole. Drawing at 270° C. gave a non-brittle film; re-drawing at 400° to 425° C. produced opaque films which were highly crystalline and oriented as measured by X-ray diffraction. The films were strong and stable in air to 475° C. Strips of film drawn at 400° to 425° C. were submitted for testing by thermogravimetric analysis (TGA). Only 4 percent weight loss was observed up to 500° C. The maximum weight loss per minute, i.e., the differential weight loss, at a 4.2° C. per minute heating rate, occurred at 585° C. Alternatively, the polyimide-oxadiazole film can be produced by heating the polyamide-oxadiazole acid film described above at 150° C. for 16 hrs., then at 300° C. for 1 hour. A clear light yellow, non-brittle film is thus produced. The inherent viscosity of this film is 0.5 (measured at 30° C. for a solution of 0.5 g./100 ml. of concentrated sulfuric acid).

The advantages of an ordered heterocycle copolymer are made clearer when the following data are considered. Films of the above described polyimide-oxadiazole (A) poly-m-phenylene-2,2'-5,5'-bibenzimidazole (B), as described in U.S. Pat. No. 3,174,947 and Re. No. 26,065 by Marvel et al, and the polypyromellitimide of bis(4-aminophenyl)ether (C), as described in U.S. Pat. No. 3,179,634 l by Edwards, were prepared and heated in a muffle furnace at 300° C., in air. After 5 weeks at 300° C., films of A and C were relatively uneffected, but film of B was badly embrittled after only 48 hrs. Upon accelerated testing at 350° C. in air, film of A was still flexible after 4 days whereas film of C failed at the end of this period. When the weights of films A, B, and C were re-checked after various periods upon exposure to air at 300° C., the following results were obtained:

|  | % of Original Weight Retained | | | | | |
| --- | --- | --- | --- | --- | --- | --- |
| Time(days) | 1 | 2 | 5 | 9 | 12 | 14 |
| A | 99.0 | 94.5 | 83.0 | 62.0 | 36.0 | 14.0 |
| B | 35.0 | 15.0 | 0.0 | — | — | — |
| C | 96.0 | 91.5 | 78.0 | 32.5 | 11.5 | 0.0 |

The clear-cut superiority of A over B, which contains a single heterocyclic unit is obvious to the extent that further comment is unnecessary. The superiority of A over C is more suprising because both A and C contain a common heterocyclic linkage, an imide group, and therefore might be expected to behave very much alike. If failure is attributed to weakness of the imide linkage in C, then A should likewise fail due to degradation of this weakest link in the polymer chain. It is not uncommon to find that the ordered heterocycle copolymers disclosed here have unpredicted superior properties to those which might have been expected based on the properties of homopolymers containing the same heterocyclic linkages, but combined in an orderly fashion in these novel compositions.

A fiber, I, of the polyimide-oxadiazole of this example was prepared; its properties under various conditions are found in Tables I, II and III.

Still another polyimide-oxadiazole was prepared using the above polymerization procedure and diamine but the dianhydride derived from benzophenone-3,3'-4,4'-tetracarboxylic acid (BPDA) was used. Excellent tough film with good thermal and electrical insulating properties was produced. A fiber, II, was prepared and its properties under various conditions are shown in Tables I, II and III.

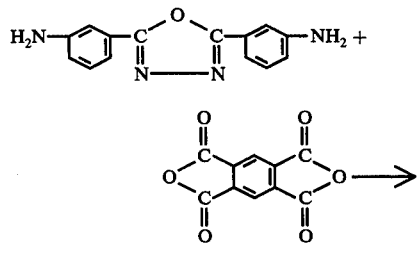

-continued

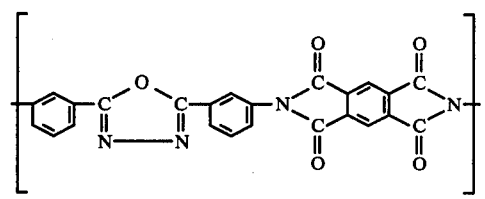

Following the procedure of Example I, a polymerization reaction was carried out between 2.20 g. of 2,5-bis(m-aminophenyl)-1,3,4-oxadiazole (m.p. 249° to 252° C.), prepared by the same general procedure used for the diamine of Example I, and 1.96 g. of PMDA in 15 ml. of dry DMAc. Films were cast and dried at 110° to 120° C. The films were converted to an imide-oxadiazole copolymer having regularly ordered sequences of linkages and were found to be stable to temperatures in excess of 400° C.

A fiber, III, was prepared of this composition and its properties under various conditions are found in Tables I, II and III.

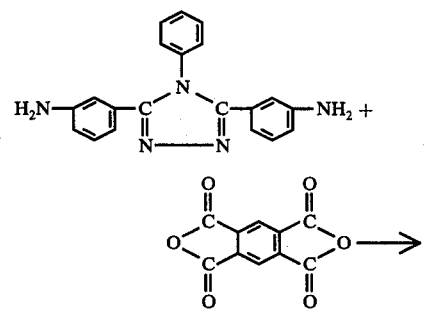

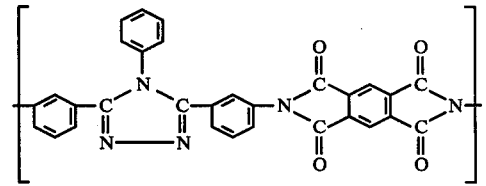

Following the procedure of Example I, a polymerization reaction was carried out using 0.49 g. of 3,5-bis(m-aminophenyl)-4-phenyl-1,2,4-triazole, and 0.33 g. PMDA in 3.2 ml. of dry dimethylacetamide. A film was cast from the solution obtained and the film was converted to an imide-4-phenyl-triazole copolymer. The clear yellow film was tough and had good resistance to thermal degradation in air.

In some of the following examples, it will be necessary to set forth the preparation of certain monomers which have not been reported heretofore, then to describe the polymerization of the monomers and the properties of the polymers.

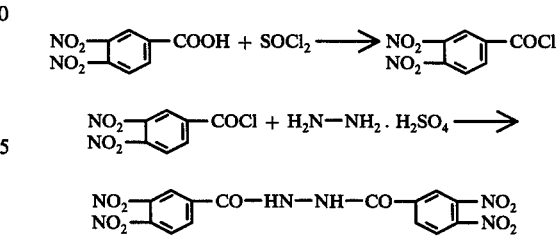

-continued

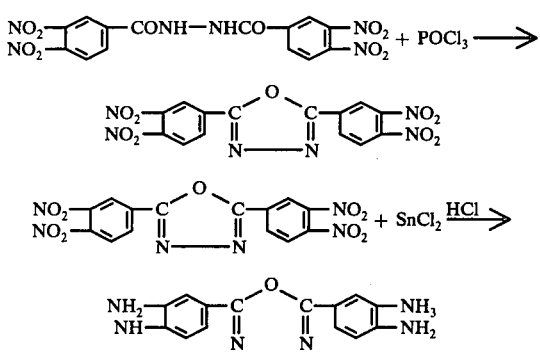

A. A 50 g. portion of 3,4-dinitrobenzoic acid was refluxed with 100 ml. of thionyl chloride for 4 hours. The thionyl chloride was removed and the product distilled at 182° to 184° C. at a pressure of 4 mm. to give 32 g. of product having a melting point of 51 to 52° C.

B. The resulting 3,4-dinitrobenzoyl chloride was dissolved in 30 ml. of tetrahydrofuran and added to rapidly stirred solution of 8.5 g. of hydrazine sulfate dissolved in 200 g. of ice and water. Next, 25 g. of sodium bicarbonate was added and the mixture stirred for about 10 minutes. The product, N,N'-bis(3,4-dinitrobenzoyl)hydrazide after filtering and recrystallization, had a melting point of 278 to 280° C. yield 30 g., 89%.

Anal. Calc'd: C, 39.99; H, 1.92; N, 19.99. Found: C, 39.87; 40.12; H, 2.20; N, 19.63; 19.40.

C. The tetranitro hyrazide was next converted to an oxadiazole by refluxing a 25.3 g. portion with 250 ml. of phosphorous oxychloride for 3 hours. Excess phosphorous oxychloride was then removed and the product washed, dried and reprecipitated. The pure, 2,5-bis(3,4-dinitrophenyl)-1,3,4-oxadiazole was obtained in a 19.0 g. of yield (78%) having a melting point of 230 to 232° C.

Anal. Calc'd: C, 59.54; H, 5.00; N, 29.77. Found: C, 59.63; 59.55; H, 5.31; 5.15; N, 29.82; 29.62.

E. Preparation of oxadiazole-benzimidazole copolymer by Solid State Polymerization

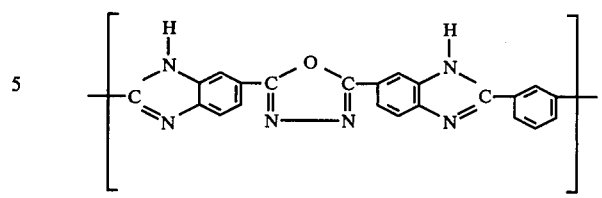

To a reaction flask was added 1.4 g. (0.005 mol) of 2,5-bis (3,4-diaminophenyl)-1,3,4-oxadiazole (m.p. 267°-271° C.) and a 1.59 g. (0.005 mol) of diphenyl isophthalate, (m.p. 134°-135° C.). The reaction was conducted in a nitrogen atmosphere at 220° C. for about 10 minutes and 265° C. for 30 minutes. Phenol and water distilled off at the latter temperature. The polymer obtained was soluble in concentrated sulfuric acid, formic acid and dimethylacetamide containing 5 percent dissolved lithium chloride.

A polymer of higher molecular weight was obtained by heating 1 g. of the polymer at 400° C. under a pressure of 0.1 mm. for 3 hours. The thermal stability of this oxadiazole-benzimidazole copolymer determined by TGA was excellent, showing weight losses at various temperatures as follows: none to 480° C., 7 percent to 500° C., and only 14 percent to 580° C.

An alternative procedure to the preparation of the polymer of this example is to heat the above tetraamine and isophthalic acid (in equimolar amounts) in a quantity of polyphosphoric acid (PPA) to 200°-250° C. under a nitrogen atmosphere. The polymer may be isolated by pouring the solution of polymer in PPA at above 100° C. into water, and washing the polymer free of acid by means of dilute base. A polymer prepared by this procedure had excellent thermal properties.

A polymer prepared using the above tetraamine and terephthalic acid was prepared by heating equimolar quantities of each in PPA; the polymer had an inherent viscosity of 0.93 (determined at 30° C. for 0.5 g. sample of polymer dissolved in 100 ml. concentrated sulfuric acid).

The above tetraamine was heated in PPA at 200°-240° C. with an equimolar quantity of the diacid described in Example IX.

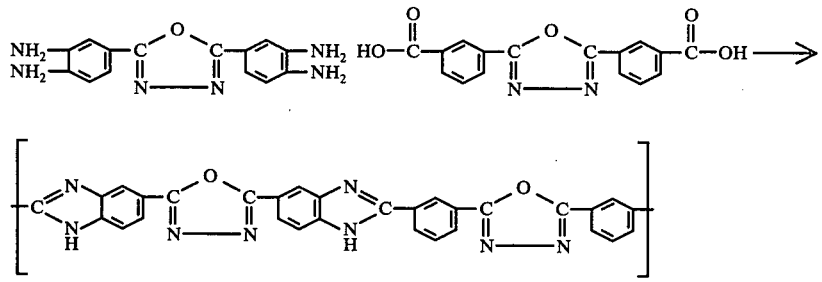

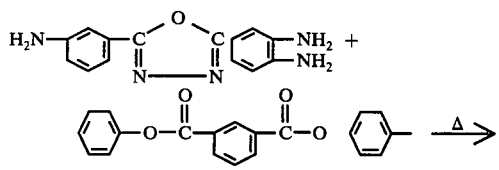

The inherent viscosity of the polymer was 0.44.

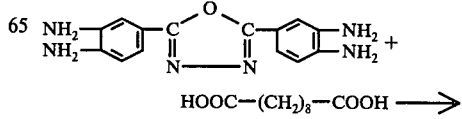

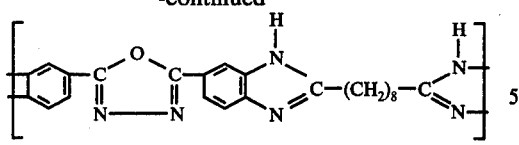

A tetraamine of Example IV in a 0.564 g. portion (0.002 mol) was reacted with 0.404 g. (0.002 mol) of sebacic acid for 2 hours and 20 minutes at 255° C. under a nitrogen atmosphere. Filaments could be pulled from the melt of the polymer which had a melting point of 343° C. The polymer was also soluble in meta-cresol.

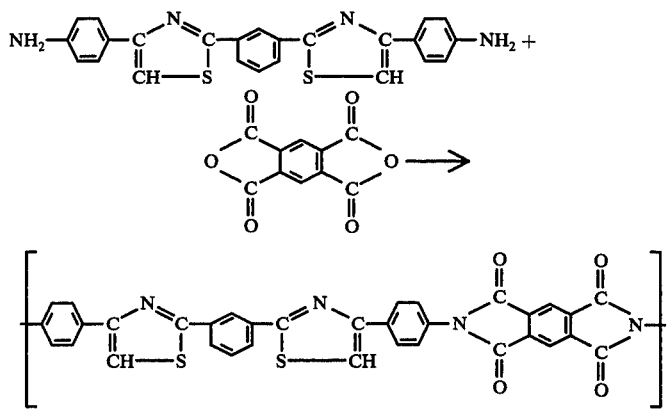

The procedure of Example I was repeated using as diamine m-bis(4-p-aminophenylthiazole-2-yl-benzene), m.p. 230°–232° C. The preparation of the diamine was accomplished by reduction of the dinitro intermediate (m.p. 271°–272° C.), formed by the reaction of isophthaloyldithio-anilide and p-nitrophenacyl bromide in dimethylacetamide.

Polymerization was effected by reacting 4.30 g. (0.01 mol) of the above diamines in 20 ml. of dry dimethylacetamide and 2.18 g. (0.01 mol) of PMDA. An additional 10 ml. of dimethylacetamide was added to the solution prior to casting films. Films were cast 20 mils. thick, dried at 110° C. for 3 hours, and placed in a mixture of 3 parts pyridine and 2 parts acetic anhydride. After 16 hours the films were soaked in dioxane for 2 hours and dried. When strips of this film were drawn over a heated ceramic pin, they showed excellent thermal stability to temperatures in excess of 425° C.

EXAMPLE VII

In this example the steps of synthesis are given for intermediates to prepare an ordered oxadiazole-triazole copolymer and an ordered oxadiazole-benzimidazole copolymer of different structure from those of Example IV or V.

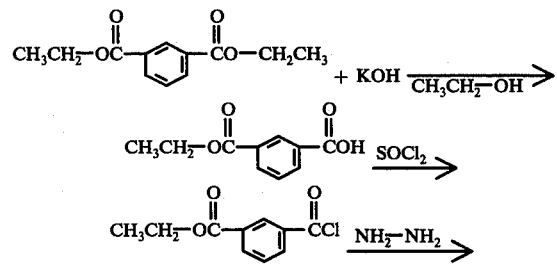

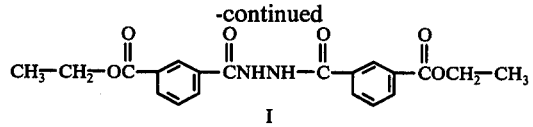

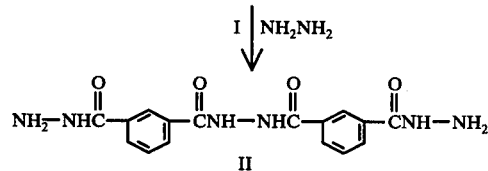

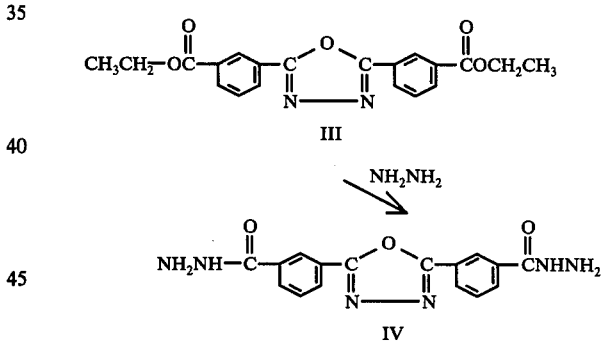

A. A 203 g. portion (1.0 mol) of isophthaloyl chloride and 250 ml. of ethanol were stirred together until the initial exothermic reaction stopped. The solution was refluxed for 30 minutes and excess ethanol was distilled. The product, diethyl isophthalate, was obtained in a 206 g. yield (boiling point of 175° to 178° C./17 mm).

B. A solution of 55 g. of this diethyl isophthalate in 140 ml. of ethanol was saponified by the addition of 15 g. of potassium hydroxide in 15 ml. of water. The resulting gel was refluxed 30 minutes, cooled and extracted with ether to remove unreacted diester. The water layer was acidified and the crude acid product precipitated. Ethyl hydrogen isophthalate having a melting point of 131° to 132° C. was obtained in a 16.5 g. yield after recrystallization from benzene.

C. The ethyl hydrogen isophthalate was then converted by thionyl chloride to m-carbethoxybenzoyl chloride, b.p. 134°–135° C./5.6 mm.

D. A solution of 9 g. of the acid chloride in 20 ml. of tetrahydrofuran was added to 2.6 g. of hydrazine sulfate in 100 g. of water and ice. Then 8 g. of sodium bicarbonate was added to the mixture which was blended for 10 minutes. The product, N,N'-bis(m-carbethoxybenzoyl hyrazide (I), was filtered, washed and dried, giving a yield of 7.7 g. having a melting point of 185° to 187° C.

Anal. Calc'd: C, 62.47; H, 5.25; N, 7.29. Found: C, 62.81; H, 5.42; N, 7.15; 7.33.

E. The hydrazide (I) was converted to an oxadiazole by reaction of refluxing phosphorous oxychloride. Excess oxychloride was stripped off and the residue recrystallized from ethanol. From 19.2 g. of the hydrazide (I) was obtained 17.8 g. of 2,5-bis(m-carboethoxyphenyl)-1,3,4-oxadiazole (III) having a melting point of 133° to 134° C.

Anal. Calc'd: C, 65.55; H, 4.96; N, 7.65. Found: C, 65.76; 65.60; H, 4.72; 5.05; N, 7.54; 7.69.

F. The 2,5-bis(m-carboethoxyphenyl)-1,3,4-oxadiazole (III) was converted to a dihydrazide (IV) by refluxing a solution of 8 g. of (III) and 300 ml. of methanol with 9 g. of 95 percent hydrazine for 3 hours. When the solution was cooled, 2.8 g. of product having a melting point of 230° to 235° C. separated.

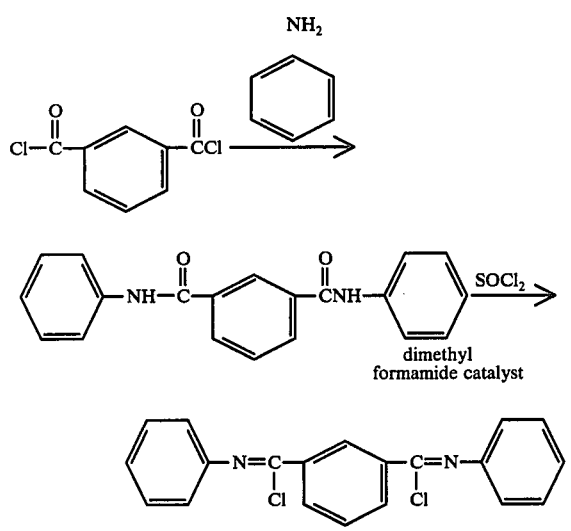

G. A portion of N,N'-diphenylisophthalamide prepared from isophthaloyl chloride and aniline was refluxed with a large excess of thionyl chloride, using a few drops of dimethylformamide as catalyst, until solution was effected. Excess thionyl chloride was distilled off and the residue recrystallized from isooctane dried with calcium hydride. The product, N,N'-diphenylisophthalimidoyl chloride having a melting point of 146° to 150° C., was prepared in nearly quantitative yield.

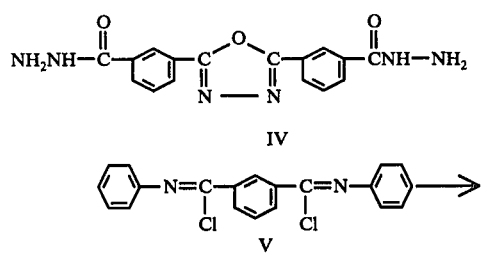

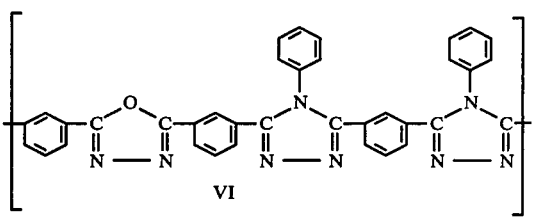

To a suspension of 1.35 g. (0.004 mol) of the dihydrazide (IV) of Example VII in 10 ml. of dimethylacetamide containing 5 percent dissolved lithium chloride was added 1.41 g. (0.004 mol) of N,N'-diphenylisophthalimidoyl chloride (V) having a melting point of 146° to 150° C. The mixture was stirred for 30 minutes at 0° C., then allowed to warm to room temperature and stirred overnight. The mixture was then heated for one hour at 130° C. and precipitated in water. The melting point of the dried polymer was 190° C. A clear film was cast from a solution of the polymer in dimethylacetamide containing 7 percent lithium chloride.

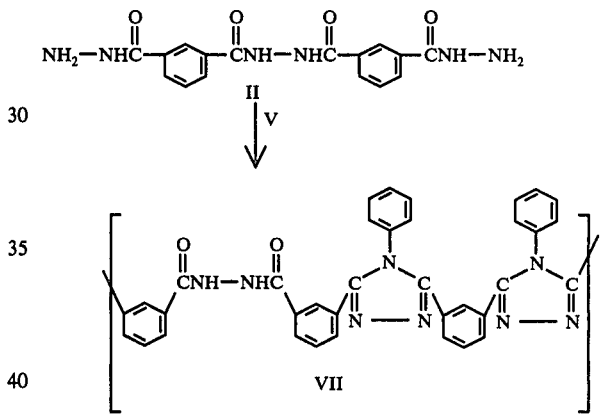

The following experiment was designed to show that a diamine containing a precursor group to a heterocyclic ring may be polymerized and the heterocyclic ring may then be formed. That is, while it is usually preferably to have a preformed heterocyclic ring in the diamine monomer, it is not the exclusive route to the polymers of this invention. To a solution of 1.78 g. (0.005 mol) of II in 12 ml. of dimethylacetamide containing 5 percent lithiumchloride was added 1.77 g. of N,N'-diphenylisophthalimidoyl chloride (V). The solution of polymer was stirred for 30 minutes at 0° C. and allowed to warm to room temperature and stirred overnight. The reaction mixture was neutralized and heated to 130° C. for an hour. The melting point of the polymer obtained was 225° C. Films were cast from a solution of the polymer in dimethylacetamide containing 7 percent dissolved lithium chloride. Polymer VII may be converted to polymer VI by a heat treatment which converts the hydrazide linkage to the oxadiazole linkage.

EXAMPLE IX

Preparation of an ordered oxadiazole-benzimidazole copolymer having a different structure from that of Examples IV or V.

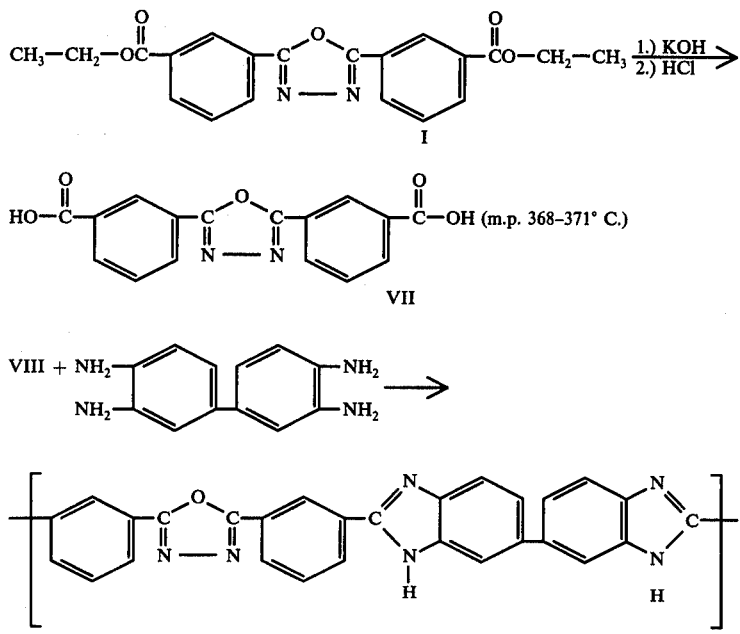

A mixture of 0.80 g. (0.00375 mol) of 3,3'-diaminobenzidine and 1.16 g. (0.00375 mol) of 2,5-bis(m-carboxyphenyl)-1,3,3-oxadiazole (VIII) was heated 30 minutes at 220° under nitrogen, then at 220° C. under reduced pressure about 30 mm. for one hour. The resulting polymer was dissolved in dimethylsulfoxide, precipitated in water and washed with methanol. Next the polymer was washed with dilute base, rinsed with water and dried. The melting point of the polymer was in excess of 470° C. A clear brown film was cast from a solution of the polymer in dimethylsulfoxide.

The following section describes the preparation of the several diamines whose polymerization will be described in the remaining Examples.

EXAMPLE X

This example gives the preparation of diamine (1) of Table IV. The technique was employed for a number of other diamines given in Table IV.

A mixture of 10.7 g. of 3,3'-diaminobenzidine, recrystallized from water-methanol, m.p. 176°–177° C., 13.7 g. of m-aminobenzoic acid, and 150 ml. of PPA was stirred and heated at 220° C. for 3.5 hrs. under a nitrogen atmosphere. The solution was cooled and poured into water and stirred rapidly in a Blendor jar; the product was collected on a filter, then soaked in 10 percent sodium carbonate solution overnight. The crude product, after washing and drying, had a m.p. of 292°–300° C. Recrystallization from ethanol afforded 15 g. of material, m.p. 306°–309° C.; sublimation afforded a very pure material free of solvent of crystallization suitable for polymerization, m.p. 297°–299° C.

Diamine (2) of Table IV was produced by substituting p-aminobenzoic acid, or alternatively ethyl p-aminobenzoate, for m-aminobenzoic acid in the above preparation.

EXAMPLE XI

Example X was repeated using 3,3'-dihydroxybenzidine in place of 3,3'-diaminobenzidine; diamines (3) and (4) of Table IV were prepared in this manner. Use of commercially available 4,4'-sulfonylbis (2-aminophenol) with m-aminobenzoic acid gave diamine (5) of Table IV.

Substitution of diamino resorcinol for 3,3'-dihydroxybenzidine yields diamines (6) and (7) of Table IV.

EXAMPLE XII

Example X was repeated using 3,3'-dimercaptobenzidine dihydrochloride; diamines (8) and (9) were prepared. The starting material, 3,3'-dimercaptobenzidine dihydrochloride was prepared as follows:

To a solution of 70.5 g. (0.38 mol) benzidine in one liter of glacial acetic acid was added 300 g. (3.4 moles) potassium thiocyanate. A solution of 50.0 g. (0.31 mole) of bromine in 400 ml. glacial acetic acid was added drop-wise over a period of 2.5 hours and the temperature of the reaction mixture was maintained throughout at 150° C. The yellow slurry was stirred overnight, then filtered. The damp filter cake was dissolved in 5 liters of boiling water to which 74 ml.conc. HCl had been added. The resulting solution was filtered. Excess conc. HCl was added to the filtrate which was then cooled. The amino-thiazole hydrochloride was collected on a filter and dried; the yield was ca. 54 g.

A 2.7 g. portion of the above material was heated under reflux for 3 hours with a solution of 80 g. KOH in 45 ml. water (nitrogen was used to blanket the system.) The orange solution was cooled and filtered into a dilute HCl solution (750 ml. water and 150 ml. conc. HCl) chilled by means of a −20° C. bath; the filtration was carried out under a nitrogen atmosphere. The product was collected on a filter, washed with cold water and dried overnight at 50° C. in a vacuum oven with a nitrogen bleed; the yield of 3,3'-dimercaptobenzidine dihydrochloride was 15 g.

EXAMPLE XIII

The following example describes a process similar to that of Example X. The diamines produced by this process are listed in Table V. Diamine (1) was prepared from phthalic acid, (2) from isophthalic acid, and (3) from terephthalic acid, the preparation of (3) is described below.

A three-necked round bottom 500 ml. flask, equipped with an all glass Truborne-type stirrer, a nitrogen inlet and a Drierite tube, was charged with 20 g. (a little over 0.1 mole) of 2,4-diaminophenol dihydrochloride, 8.3 g. (0.005 mole) of terephthalic acid, and 70 ml. of polyphosphoric acid. The flask was put in an oil bath, and under continuous stirring, while the system was blanketed with nitrogen, the contents of the flask were heated to 110° C. very slowly, so as to control excessive foaming. The flask was kept at 110° C. for 1 hour, then the temperature was slowly increased to 210° C., where it was kept for three hours. After cooling, the contents of the flask were poured into 600 ml. of water. The brownish precipitate was soaked overnight in 600 ml. of an aqueous 10 percent sodium carbonate solution, filtered off, washed with water and dried in a vacuum oven at 60° C. (yield 96 percent).

Diamine (3) was purified by extraction with acetone or alcohol in a Soxhlet apparatus to remove starting materials; then it was dissolved in a large quantity of heat dimethylformamide (DMF), some charcoal was added, and the hot solution was filtered on a sintered glass funnel of medium porosity. After cooling, the diamine was recovered from the filtrate by the addition of water. Sublimation yielded a diamine of excellent purity, suitable for polymerization.

Other diacids used in the above manner (correcting proportions for differences in formula weights) were: 4,4'-bibenzoic, 4,4'-dicarboxyldiphenyl ether, 4,4'-bibenzoic acid -2,2'-sulfone, 4,4'-stilbenedicarboxylic acid and 2,6-naphthalenedicarboxylic acid. Diamines (4) and (8) were produced.

EXAMPLE XIV

The procedure of Example XIII was repeated using 2,4-diaminomercaptan dihydrochloride in place of 2,4-diaminophenol dihydrochloride; diamines (9) and (10) were produced. The 2,4-diaminomercaptan dihydrochloride was prepared by procedures reported in Rec. Trav. Chim., 20, 131 (1901) and Ibid., 53, 309 (1931).

In the following section the polymerization of selected diamines of Tables IV and V will be given and the properties of the fibers prepared from the polymers produced will be given. Any of the diamines of Table IV and V may readily be polymerized using the procedure described in Example I. Films of the ordered poly(oxadiazole-imide), (benzimidazoleimide), and benzothiazole-imide) copolymers were tough, yellow materials of quite high thermal stability.

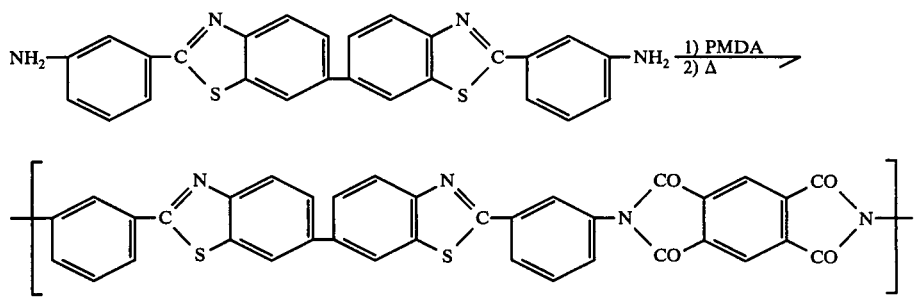

A solution of 13.50 g. (0.03 mol) 2,2'-bis(m-aminophenyl)-5,5'-bibenzothiazole, diamine (1) Table IV, in 140 ml. DMAc was cooled to 0° C. and 6.54 g. (0.03 mole) PMDA was added. The solution (12.5% solids) was stirred at 0° C. for several hours, then allowed to warm to room temperature and stirred overnight. The sample was spun at a rate of 53.4 feet/min.

The fiber, IV, had a denier of 13.5 and tenacity/elongation/initial modulus (T/E/Mi) of 2.2/33.2/32 after the heat treatment at 300° C. A drawn sample has T/E/Mi of 4.7/19.3/57. Tensile properties at elevated temperatures and after heat-aging are found in Tables I and II, respectively.

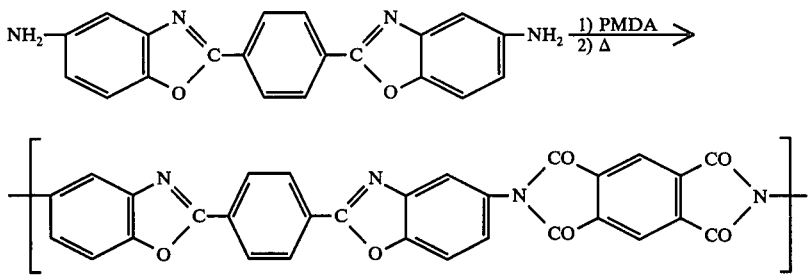

Using the procedures above, p,p'-phenylene-bis-2(5-aminobenzoxazole) diamine (3) of Table V, was polymerized with PMDA in N-methylpyrrolidone and the resulting dope was spun. The properties of the fiber, V, after heat treatment, are found in Tables I and II.

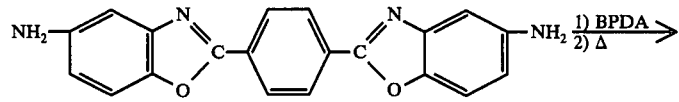

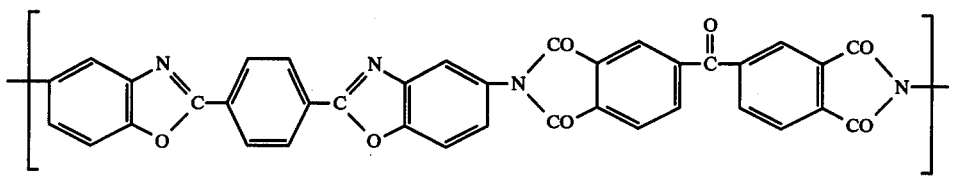

A polymer solution prepared from the reaction of p,p'-phenylenebis-2(5-aminobenzoxazole) with BPDA in DMAc was spun from a 4-hole 9-mil. spinneret at a rate of 72.3 feet/min. The fiber, VI after heat treatment at 300° C., had tensile properties of T/E/Mi/Denier = 6.4/5.8/203/22; a hot drawn fiber had T/E/Mi/denier = 9.1/4.9/269/19.3. Tensile properties at elevated temperatures are found in Table I; the retention of tenacity after heat-aging for this fiber (Table II) are outstanding. Even at 350° C. this fiber had T/E/Mi after 1, 2 and 5 days of 4.5/2.6/227; 3.3/2.4/139; and 1.2/2.1/103, respectively.

A repeat of this experiment using polymer of considerably lower solution viscosity gave an undrawn fiber of T/E/Mi/denier = 2.6/17.0/66/25.9; the hot drawn fiber, however, had T/E/Mi/denier = 9.0/4.1/289/19.0.

300° C. without hot drawing. Hot drawing in all cases did produce or improve orientation and crystallinity. The density of the various fibers was 1.4–1.46.

Light stability as determined in the Fade-Ometer was rather good (Table III) and the light stability in diffuse daylight was also good.

EXAMPLE XIX

Two dinitro quinoxalines were prepared by reacting 4-nitro-o-phenylenediamine with, respectively, 1,4-phenylenediglyoxal prepared by the method of Stille (J. Polymer Sci., A2, 3867, 1964) and 4,4'-diglyoxalyl-diphenyl ether prepared by the method of Stille (J. Polymer Sci., A3, 1013, 1965). The dinitro intermediates were reduced to yield quinoxaline diamines (1) and (2). Another dinitro compound (3) was produced from the reaction of 4-nitro-o-phenylenediamine and BPDA

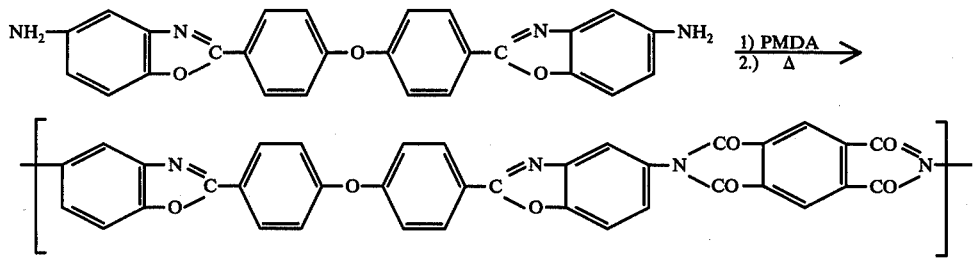

To a solution of 6.08 g. (0.014 mole) p,p'-bis-2,(5-aminobenzoxazole) diphenyl ether diamine (5) Table V, in 75 ml. DMAc, cooled to 0° C. was added 3.05 g. (0.014 mole) PMDA. After 4 hours the dope was allowed to warm to room temperature and an additional 20 ml. of DMAc was added. The spinning dope (9% solids) was stirred overnight prior to spinning.

The above dope was spun through a 6 hole, 7-mil. spinneret at a rate of 59.8 feet/min.

After the heat treatment at 300° C., the fiber, VII, had the following tensile properties: denier 7.8, T/E/Mi = 3.0/5.9/72. A drawn fiber had a denier of 5.56, T/E/Mi = 7.5/7.1/147; another lot of drawn fiber had the tensile properties shown in Table I. Heat-aging data for the undrawn fiber are shown in Table II.

in PPA as described in Example X.

Anal. Calc'd: C, 62.0; H, 2.2; N, 15.1. Found: C, 62.02; H, 2.50; N, 15.07.

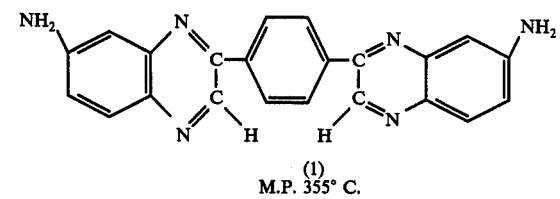

(1)
M.P. 355° C.

Anal. Calc'd: C, 72.5; H, 4.4; N, 23.1. Found: C, 72.44; H, 4.41; N, 22.74.

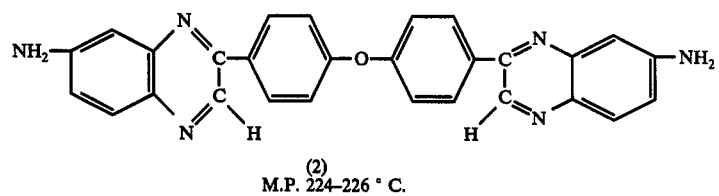

(2)
M.P. 224–226° C.

All of the fiber described above in all of the various examples were crystallizable; some showed considerably crystallinity and orientation after heat treatment at Anal. Calc'd: H, 4.4; N, 18.5. Found: H, 4.38; N, 17.35.

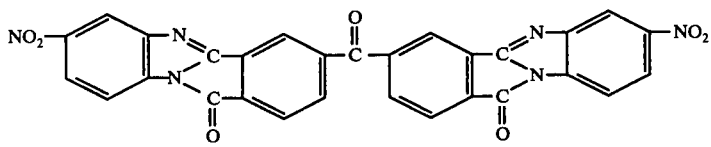

(3)

Diamines (1) and (2) were polymerized with BPDA to yield a very viscous solution from which films were cast, after heat treatment, very strong films were produced. Thermal stability of the films was quite good.

EXAMPLE XX

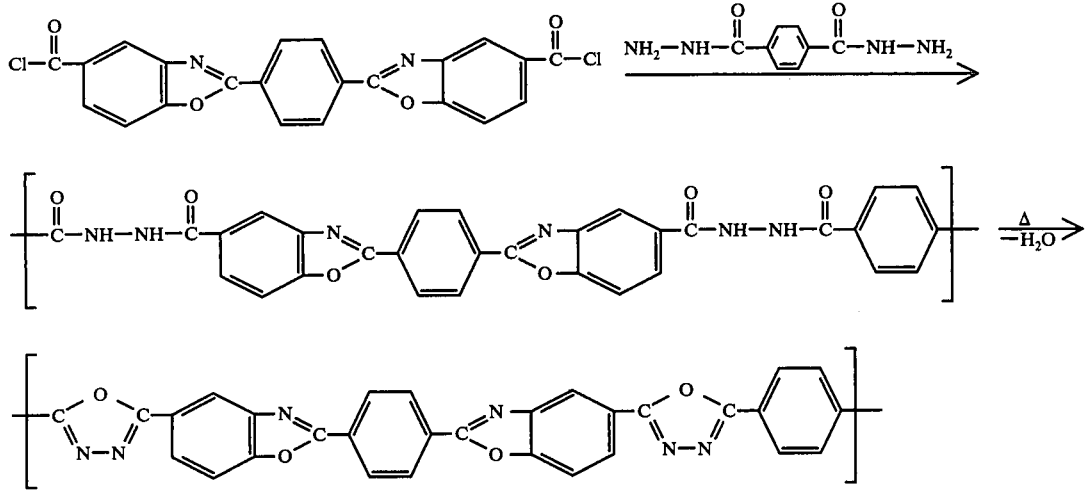

A slurry of 0.194 g. (0.001 mole) terephthaloyl dihydrazide in 5 ml. of hexamethylphosphoramide (HPT) was cooled to −30° C. and 0.437 g. (0.001 mole) of the diacid chloride of p-phenylene-bis-2(5-carboxybenzoxazole) was added. The reaction mass was nearly solid, hence 5 ml. more HPT was added; the polymer was difficulty soluble at this point. Films were cast from solution and heated to 300° C. to convert the polymer to an ordered oxadiazole-benzoxazole copolymer.

The diacid chloride used in this Example and in the following one was prepared in a manner similar to that employed for the diamines of Table V. Thus, terephthalic acid was heated with 3-amino-4-hydroxybenzoic acid in PPA. The resulting benzoxazole diacid was refluxed with thionyl chloride to convert it to the corresponding diacid chloride.

The sequences of oxadiazole and benzoxazole units are definitely fixed by the synthesis employed and no chance for random or block copolymerization is allowed.

EXAMPLE XXI

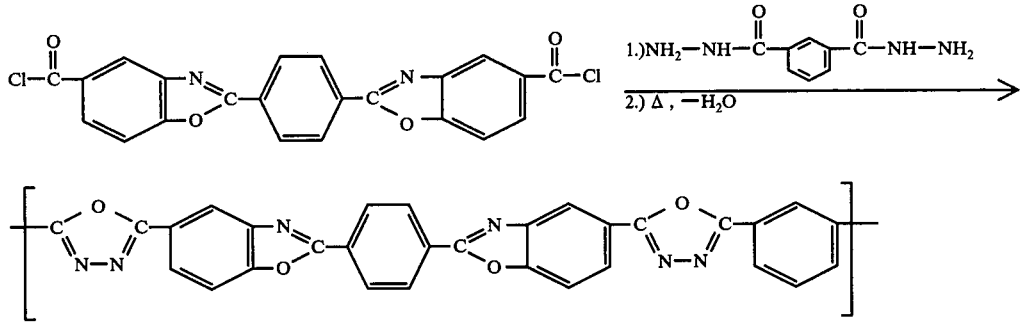

Example XX was repeated using isophthaloyl dihydrazide. No difficulty was experienced in keeping the polymer in solution (6.7% solids); a good film was obtained by casting the solution on a glass plate and evaporating the solvent. Heating the benzoxazole-hydrazide film to 300° C. converted it into an ordered oxadiazole-benzoxazole copolymer.

The sequences not only of oxadiazole and benzoxazole units are determined unequivally, but also the regular alternation of m- and p-phenylene rings is determined.

EXAMPLE XXII

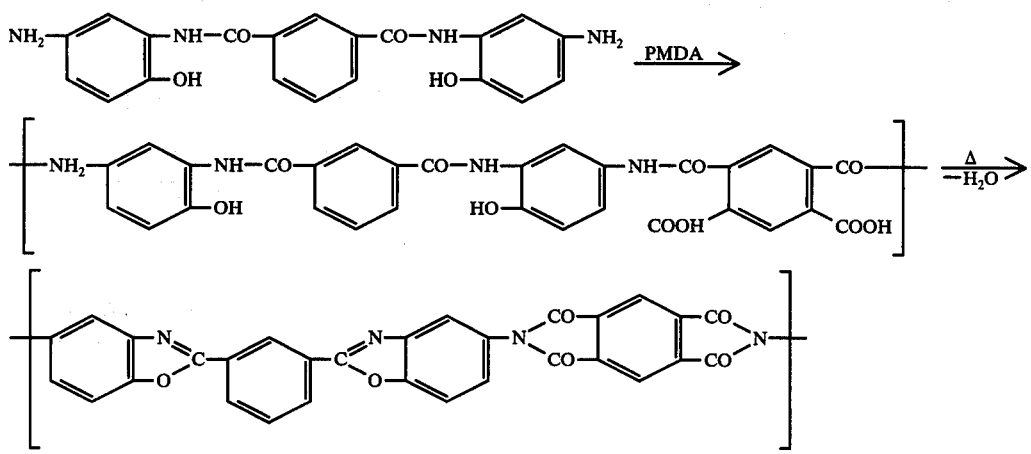

The polymer prepared according to this Example is the same composition as that formed from diamine (2) of Table V and PMDA. However, here, as in Example VIII, a monomer containing a heterocyclic precursor linkage was used. The starting diamine, m.p. 280°–282° C., was prepared by reduction of the dinitro intermediate formed from isophthaloyl chloride and 4-nitro-o-aminophenol.

A 0.378 g. (0.001 mole) portion of bis-N,N'-3-amino-6-hydroxyphenyl isophthalamide was reacted with 0.218 g. (0.001 mole) PMDA in 4 ml. DMAc, or alternatively N-methylpyrrolidone (NMP), at 0° C. to yield an amide-phenol-acid polymer from which strong films were cast. The polymer had an inherent viscosity of 0.5 (30° C; 0.5 g/100 ml. DMAc).

When the above film was heated at 140° C. for 16 hours in air, then to 360° C. in air, an ordered benzoxazole-imide copolymer was produced. A better product was obtained when the film was heated in an inert atmosphere.

EXAMPLE XXIII

The experiment above was repeated except that the diamine, m.p. 382°–385° C. contained a p-phenylene unit. The inherent viscosity of the amide-phenol-acid polymer was 1.13 (30° C., 0.5 g/100 ml. DMAc). The resultant film of ordered benzoxazole-imide copolymer (after heat treatments) was clear and tough.

EXAMPLE XXIV

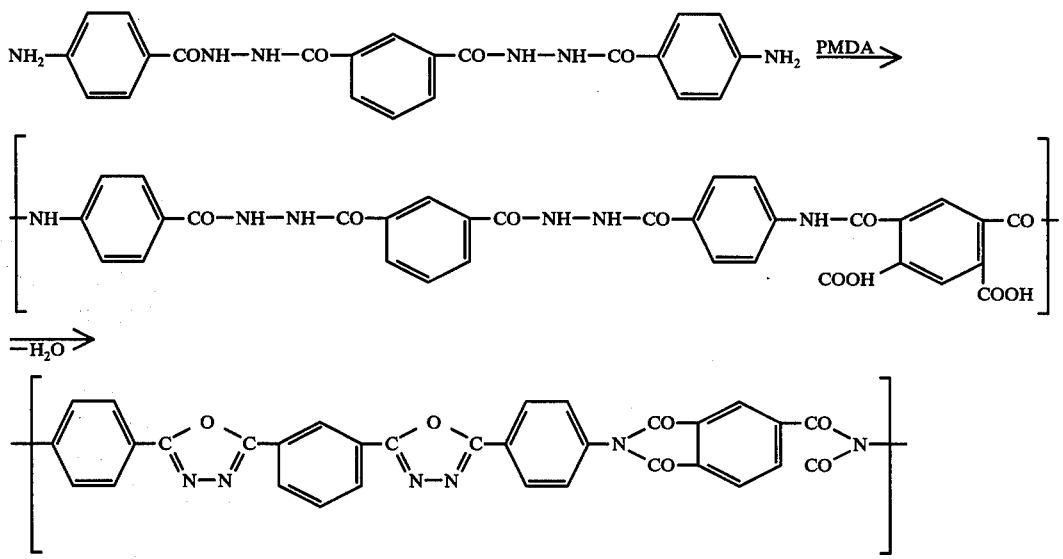

The diamine, m.p. 305°–306° C., containing hydrazide linkages was prepared by reducing the dinitro intermediate, m.p. 319°–320° C., obtained from the reaction of one mole isophthaloyl chloride with p-nitrobenzhydrazide in DMAc.

A 0.216 g (0.005 mole) sample of m-phenylene-bis-(p-aminobenzhydrazide) was dissolved in 4 ml. DMAc. To the solution, cooled to 0° C., was added 0.109 g (0.005 mole) PMDA; the solution was stirred for 3 hrs. at 0° C., then allowed to warm to room temperature. Good film was cast from the viscous solution. The film was converted from a hydrazide-amino-acid to an ordered oxadiazole-imide copolymer by heat treatments according to the following periods of heating: 16 hrs. at 140° C., 1 hr. at 300° C., and 30 min. at 350° C. The film so treated showed little or no change in tensile properties or in color after 72 hrs. exposure at 350° C. in air. Resistance to oxidation at 350° C. upon prolonged exposure to air was outstanding.

The polymer of this Example was prepared on a larger scale and spun to fiber. Excellent fiber, after heat treatments at 300°-325° C., was obtained. This fiber showed outstanding resistance to oxidation upon exposure to air at 300° C. in long term aging tests and the retention of tenacity at elevated temperatures was remarkable.

TABLE I

Tensile Properties of Various Ordered Heterocycle Copolymer Fibers at Elevated Temperatures

| Temp. °C. | I | II | III | IV | V | VI | VII |
|---|---|---|---|---|---|---|---|
| | | | | T/E/M$_i$ (Work) | | | |
| R. T. | 5.2/6.1/110 | 6.3/9.7/122 | 2.4/11.1/42 | 4.7/19.3/57 | 4.8/5.1/168 | 6.4/5.8/203 | 5.2/4.0/148 |
| 50 | | | 4.0/27.0/86 | | 4.4/4.9/167 | | |
| 100 | 4.0/5.8/91 | 4.5/8.7/86 | 2.9/12.2/65 | 3.6/18.4/44 | 4.4/5.7/154 | | |
| 150 | 3.7/5.2/100 | 3.7/8.8/77 | 2.0/6.5/23 | | | | |
| 200 | 3.1/4.2/105 | 3.2/8.5/67 | 1.8/14.4/56 | 2.9/25.9/40 | 3.5/8.8/146 | | |
| 250 | 2.5/4.8/89 | 2.5/8.1/69 | 1.1/17.7/36 | | 2.9/6.6/136 | | |
| 300 | 2.1/6.0/44 | 1.4/9.7/45 | 1.0/18.0/42 | 1.8/22.6/28 | 2.3/10.2/80 | 2.0/14.9/65 | 2.0/5.0/63 |
| 350 | 1.8/5.4/60 | 0.9/10.6/16 | 0.4/43.9/14 | 1.8/32.0/22 | 2.1/10.0/70 | 1.6/13.2/53 | |
| 400 | 1.4/3.7/58 | 0.7/7.8/11 | 0.11/82.1/7 | 1.7/31.5/15 | 1.6/6.8/57 | 1.5/15.7/32 | 1.1/3.6/32 |
| 450 | 1.1/2.6/56 | 0.5/3.6/12 | 0.1/36.4/5 | 0.9/20.0/6 | 1.5/5.6/59 | 1.0/7.7/29 | 1.1/3.4/31 |
| 500 | 0.8/1.4/31 | 0.4/3.1/7 | 0.1/18.7/1 | 0.6/6.9/10 | 1.7/4.2/67 | | |
| zero strength temp.[2] | | | | 555° C | | 572° C | 510° C |

[1]T/E/M$_i$ = Tenacity, Elongation, Modulus in grams/denier.
[2]The temperature at which the fiber fails to support a 0.1 g/den. load (in nitrogen).

TABLE II

Tensile Properties of Various Ordered Heterocyclic Copolymer Fibers After Thermal Aging in Air at 300° C

| Time, Days | I | II | III | IV | V | VI | VII |
|---|---|---|---|---|---|---|---|
| | | | | T/E/M$_i$ (Work) | | | |
| 0 | 5.2/6.1/110 (0.221) | 6.3/9.7/122 (0.419) | 1.84/9.9/46 (0.350) | 2.2/33.2/32 | 5.1/5.3/188 (0.211) | 6.4/5.8/203 | 3.0/5.9/72 |
| 1 | 5.1/5.7/113 (0.173) | 5.7/7.6/123 (0.283) | 2.37/16.9/49 (0.330) | 2.6/37.7/32 | 5.0/4.6/188 (0.179) | 7.4/8.8/204 (0.531) | 2.9/5.6/83 |
| 2 | 5.0/5.3/111 (0.152) | 4.9/6.0/117 (0.181) | 2.3/24.0/45 (0.460) | 2.6/34.3/33 | | | 2.8/5.4/84 |
| 7 | 4.1/3.9/119 (0.098) | 3.9/4.4/122 (0.122) | | 2.6/32.1/33 | 4.0/3.0/187 (0.091) | 6.3/4.5/208 (0.222) | 2.6/4.3/87 |
| 10 | | | | 2.4/27.1/32 | 3.1/2.3/194 (0.056) | 6.0/4.5/235 (0.192) | 2.3/3.5/92 |
| 14 | | | 1.9/14.3/44 (0.277) | 2.3/25.7/34 | 4.0/2.9/195 (0.078) | 5.2/4.6/165 (0.164) | 2.1/3.1/87 |
| 21 | 3.3/3.4/113 (0.068) | 3.7/3.9/116 (0.088) | 1.6/6.7/39 (0.078) | | 3.3/2.2/197 (0.050) | 5.1/4.3/173 (0.166) | |
| 28 | 3.7/3.4/132 (0.073) | 2.8/3.6/108 (0.058) | 1.5/7.6/41 (0.086) | | 3.6/2.7/190 (0.060) | | |
| 35 | 2.7/3.0/113 (0.051) | 1.7/2.4/116 (0.023) | | | 0.8/1.6/- (0.009) | 4.7/2.9/201 (0.090) | |
| 49 | 1.8/2.1/117* | 1.7/2.3/110* | 2.1/6.1/69 (0.087) | | | 5.3/3.6/193 (0.128) | |
| 70 | | | | | | 1.9/1.5/173 (0.019) | |

*at 56 days

TABLE III

Ultraviolet Light Stability of Ordered Heterocycle Copolymer Fibers Measured by Means of the Fade-Ometer

| Hours | I | II | III | IV | V |
|---|---|---|---|---|---|
| | | | T/E/M$_i$ (Work) | | |
| 0 | 5.2/6.1/110 | 6.3/9.7/122 | 2.2/33.2/32 | 4.9/6.6/144 | 3.0/6.3/72 |
| 20 | 4.2/5.1/110 | 4.5/6.4/112 | 1.9/18.1/33 | 4.7/5.9/142 | 2.4/4.2/82 |
| 40 | 4.3/4.9/112 | 4.4/6.4/104 | 1.8/14.2/28 | 4.7/6.3/144 | 2.3/3.8/83 |
| 60 | | 4.4/5.9/111 | 1.8/13.0/29 | | 2.0/3.2/74 |
| 80 | 3.8/4.6/110 | 4.3/6.0/106 | 1.6/10.8/30 | 4.7/7.0/138 | 2.0/3.5/79 |
| 140 | 3.3/4.2/101 | 3.9/4.9/112 | 1.5/8.6/29 | 4.6/6.7/134 | 1.8/3.1/77 |

TABLE IV

Ordered Heterocycle Copolymer Diamines Derived from Aminoacids

| Diamines: | Appearance | M.P.° C. | Solubility |
|---|---|---|---|
| (1) 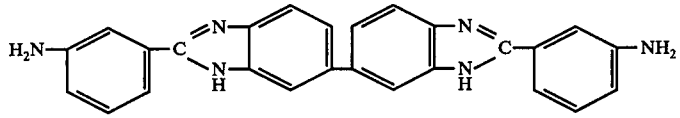 | White crystal | 297-299 | EtOH |

TABLE IV-continued
Ordered Heterocycle Copolymer Diamines Derived from Aminoacids

| Diamines: | Structure | Appearance | M.P.° C. | Solubility |
|---|---|---|---|---|
| (2) | H₂N—C₆H₄— —C₆H₄—NH₂ | White crystal | 321–322 | EtOH |
| (3) | H₂N—Ar—C(=N)—O—benzoxazole—benzoxazole—O—(N=)C—Ar—NH₂ | Yellow crystal | 310–313 | DMAc[a] |
| (4) | H₂N—C₆H₄— —C₆H₄—NH₂ | Yellow crystal | 346–349[b] | DMAc |
| (5) | H₂N—Ar—C(=N)—O—Ar—SO₂—Ar—O—(N=)C—Ar—NH₂ | White crystal | 305–310 | DMAc |
| (6) | H₂—N—Ar—C(=N)—O—(fused benzobisoxazole)—O—(N=)C—Ar—NH₂ | Yellow crystal | 307–309 | DMAc |
| (7) | H₂—N—C₆H₄— —C₆H₄—NH₂ | Yellow crystal | 407–409 | DMAc |
| (8) | H₂—N—Ar—C(=N)—S—benzothiazole—benzothiazole—S—(N=)C—Ar—NH₂ | Yellow crystal | 292–293 | DMAc |
| (9) | H₂—N—C₆H₄— —C₆H₄—NH₂ | Yellow crystal | 373–374 | DMAc |

[a] U.V. Spectrum, Max mμ 334(shoulder)-365.
[b] Decomposition

TABLE V
Ordered Heterocycle Copolymer Diamines Derived from Diacids

| Diamine: | Structure | Appearance | M.P.° C. | U.V. Spectrum max mμ |
|---|---|---|---|---|
| (1) | H₂—N—benzoxazole—C(=N)—Ar(m)—C(=N)—benzoxazole—NH₂ | Yellow crystal | 188–190 | 330 (Shoulder) |
| (2) | (m-C₆H₄) | Yellow crystal | 302–305 | 287–362 |
| (3) | (p-C₆H₄) | Bright yellow crystal | 382–384 | 320–395 |

TABLE V-continued
Ordered Heterocycle Copolymer Diamines Derived from Diacids

| Diamine: | | Appearance | M.P.° C. | U.V. Spectrum max mμ |
|---|---|---|---|---|
| (4) | ![biphenyl] | Yellow crystal | 360–363 | 323–379 |
| (5) | ![diphenyl ether] | Yellow crystal | 312–314 | 297–354 |
| (6) | ![dibenzothiophene dioxide] | Yellow crystal | 365 dec. | — |
| (7) | ![stilbene] | Bright yellow crystal (orange-red cycon heating) | 363 dec. | 332–395 |
| (8) | ![naphthalene] | Yellow crystal | 368–370 | — |
| (9) | ![bis-benzothiazole diamine] | Yellow crystal | 293–294 | — |
| (10) | ![diphenyl ether] | Yellow crystal | 267–268 | — |

These tables, particularly those showing the properties of fibers prepared from the ordered heterocyclic copolymers of the invention, vividly illustrate the unusual and unexpected thermal stability in air which is made possible by the concept of alternating heterocyclic and hydrocarbon linkages.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. An essentially linear heterocyclic polymer consisting essentially of at least two different recurring units wherein at least one recurring unit is an imide, said recurring units consisting essentially of one or more 5 or 6 membered heterocyclic rings which rings contain from 1-3 heterocyclic ring members selected from —O—, —S—, —NR— or =N—where R is a hydrocarbon radical having from 1-15 carbon atoms and where two hetero ring atoms are adjacent when more than two hetero ring atoms are present, said units occurring in a regularly ordered sequence in the polymer chain said polymer having a degree of polymerization in an excess of 10". and having interposed between each of said heterocyclic units a multivalent hydrocarbon unit having from 1-15 carbon atoms, each of said recurring structural units of the polymer having symmetrical configuration.

2. The polymer of claim 1 wherein one of said different heterocyclic units is represented by the formula:

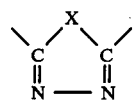

where X represents —O—, —S— or —NR—.

3. The polymer of claim 1 wherein one of said different heterocyclic units is represented by the formula:

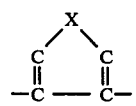

wherein X is —O—, —S— or —NR—.

4. The polymer of claim 1 wherein one of said different heterocyclic units is represented by the formula:

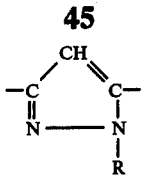

where R is hydrogen or lower alkyl.

5. The polymer of claim 1 wherein one of said different heterocyclic units represented by the formula

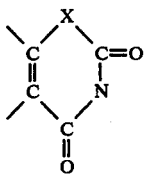

where X is —O— or —NH—.

6. The polymer of claim 1 wherein one of said different heterocyclic units is represented by the formula:

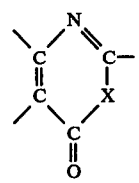

where X is —O— or —NH—.

7. The polymer of claim 1 wherein one of said different heterocyclic units is represented by the formula:

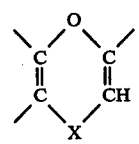

where X is —CH$_2$— or —NR— and where R is hydrogen or lower alkyl.

8. The polymer of claim 1 wherein one of said different heterocyclic units is represented by the formula:

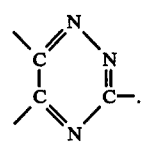

9. The polymer of claim 1 wherein one of said different heterocyclic units is represented by the formula:

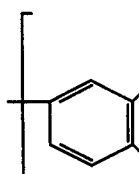

10. The polymer of claim 1 wherein one of said different heterocyclic units is represented by the formula:

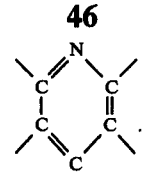

11. The polymer of claim 1 wherein one of said different heterocyclic units is represented by the formula:

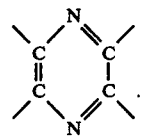

12. The polymer of claim 1 wherein one of said different units consists essentially of the ring represented by the formula:

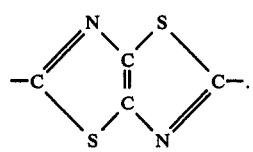

wherein X represents —O—, —S— or —NR—.

13. A linear heterocyclic polymer consisting essentially of recurring units of the formula

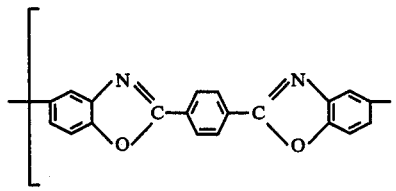

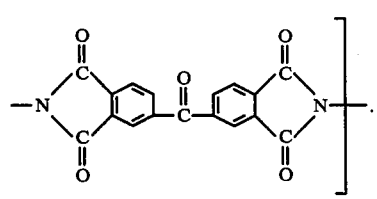

and having a degree of polymerization in excess of 10".

14. A process for the preparation of a heterocyclic polymer consisting of recurring structural units of the formula

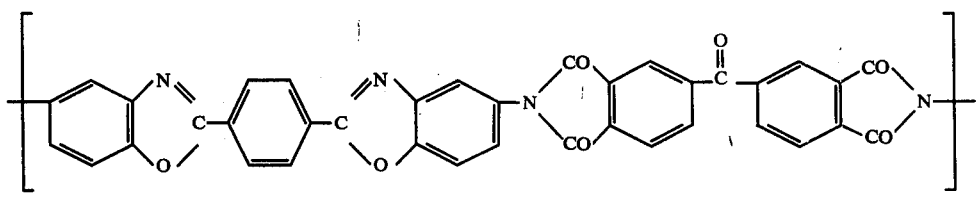

comprising reacting together substantially equimolar proportions of (A) p,p'-phenylenebis-2(5-aminobenzoxazole) and (B) benzophenone dianhydride and continuing the reaction until said heterocyclic polymer is obtained.

* * * * *

UNITED STATES PATENT AND TRADEMARK OFFICE
CERTIFICATE OF CORRECTION

PATENT NO. : 4,087,409

DATED : May 2, 1978

INVENTOR(S) : Jack Preston

It is certified that error appears in the above—identified patent and that said Letters Patent is hereby corrected as shown below:

Claim 13, line 52, "in excess of 10"." should read
--in excess of 10.--

Claim 14, after the formulation, insert --and having a degree of polymerization in excess of 10--

Signed and Sealed this

Fourteenth Day of April 1981

[SEAL]

Attest:

RENE D. TEGTMEYER

Attesting Officer     Acting Commissioner of Patents and Trademarks